United States Patent
Kania et al.

(10) Patent No.: US 8,327,579 B2
(45) Date of Patent: Dec. 11, 2012

(54) SUPER-ENHANCED, ADJUSTABLY BUOYANT FLOATING ISLAND

(75) Inventors: Bruce G. Kania, Shepherd, MT (US); Frank M. Stewart, Bozeman, MT (US); Russell F. Smith, Livingston, MT (US); Thomas N. Coleman, Livingston, MT (US); Alfred Cunningham, Bozeman, MT (US)

(73) Assignee: Fountainhead LLC, Shepherd, MT (US)

( * ) Notice: Subject to any disclaimer, the term of this patent is extended or adjusted under 35 U.S.C. 154(b) by 0 days.

(21) Appl. No.: 12/886,540

(22) Filed: Sep. 20, 2010

(65) Prior Publication Data

US 2011/0005448 A1    Jan. 13, 2011

Related U.S. Application Data

(62) Division of application No. 11/569,491, filed on Nov. 21, 2006.

(51) Int. Cl.
*A01G 31/00* (2006.01)

(52) U.S. Cl. .......................................... 47/59 R; 47/59 S

(58) Field of Classification Search .................. 47/59 R, 47/59 S, 64, 62 R, 9, 65.7, 73, 74, 77, 79, 47/81

See application file for complete search history.

(56) References Cited

U.S. PATENT DOCUMENTS

| | | | |
|---|---|---|---|
| 2,639,549 A | 5/1953 | Wubben et al. | |
| 3,927,491 A | 12/1975 | Farnsworth | |
| 4,037,360 A | 7/1977 | Farnsworth | |
| 4,086,161 A | 4/1978 | Burton | |
| 4,318,361 A * | 3/1982 | Sluys | 114/263 |
| 4,487,588 A * | 12/1984 | Lewis et al. | 441/43 |
| 4,536,988 A | 8/1985 | Hogen | |
| 4,803,943 A * | 2/1989 | Corbett | 114/263 |
| 4,930,253 A * | 6/1990 | Todd, Sr. | 47/65 |
| 5,106,504 A | 4/1992 | Murray | |
| 5,143,020 A | 9/1992 | Patrick | |
| 5,207,733 A | 5/1993 | Perrin | |
| 5,224,292 A | 7/1993 | Anton | |
| 5,261,185 A * | 11/1993 | Koide et al. | 47/63 |

(Continued)

FOREIGN PATENT DOCUMENTS

JP    08072787 A  *  3/1996

(Continued)

OTHER PUBLICATIONS

Machine translation for JP10211897A.*

(Continued)

*Primary Examiner* — Son T Nguyen
(74) *Attorney, Agent, or Firm* — Antoinette M. Tease

(57) ABSTRACT

A floating island comprising one or more layers of nonwoven mesh material and optional buoyant nodules. The mesh material is optionally coated with a spray-on elastomer or inoculated with nutrients or microorganisms. The island can include buoyant growth medium, floats, buoyant blocks, a prefabricated seed blanket, a dunking feature, capillary tubes, wicking units and/or bell flotation units. A larger embodiment is comprised of nonwoven mesh material, buoyant nodules, supplemental flotation units, stepping pads and optional load distribution members. Other optional features include a stepping stone flotation assembly, a stepping stone/vertical buoyant member flotation assembly, and a floating log assembly. The buoyancy of the island can be adjusted with a rigid framework of horizontal members, vertical members that can be moved vertically within the island, and/or a framework of prefabricated flotation tubes and cross members. The present invention also covers a floating island with a boat docking location.

7 Claims, 28 Drawing Sheets

U.S. PATENT DOCUMENTS

| | | | |
|---|---|---|---|
| 5,312,601 A | 5/1994 | Patrick | |
| 5,337,516 A | 8/1994 | Hondulas | |
| 5,528,856 A | 6/1996 | Smith et al. | |
| 5,766,474 A | 6/1998 | Smith et al. | |
| 5,799,440 A * | 9/1998 | Ishikawa et al. | 47/65 |
| 5,836,108 A | 11/1998 | Scheuer | |
| 5,980,738 A | 11/1999 | Heitkamp et al. | |
| 6,014,838 A | 1/2000 | Asher | |
| 6,086,755 A | 7/2000 | Tepper | |
| 6,233,870 B1 * | 5/2001 | Horibata | 47/62 R |
| 6,555,219 B2 | 4/2003 | Kosinski | |
| 6,615,539 B1 | 9/2003 | Obonai et al. | |
| 6,751,903 B2 * | 6/2004 | Shryock | 47/59 R |
| 6,994,048 B1 * | 2/2006 | Jennings | 114/266 |
| 7,087,161 B1 * | 8/2006 | Nishibori et al. | 210/170.01 |
| 2003/0051398 A1 | 3/2003 | Kosinski | |
| 2003/0208954 A1 * | 11/2003 | Bulk | 47/39 |
| 2005/0044788 A1 * | 3/2005 | Tang et al. | 47/59 S |
| 2005/0183331 A1 | 8/2005 | Kania et al. | |

FOREIGN PATENT DOCUMENTS

| | | | | |
|---|---|---|---|---|
| JP | 10211897 A | * | 8/1998 | |
| JP | 2002000098 A | * | 1/2002 | |
| JP | 2002051652 A | * | 2/2002 | |
| JP | 2003023885 A | * | 1/2003 | |

OTHER PUBLICATIONS

Machine translation for JP2002000098A.*

Machine translation for JP2002051652A.*

Machine translation for JP2003023885.*

* cited by examiner

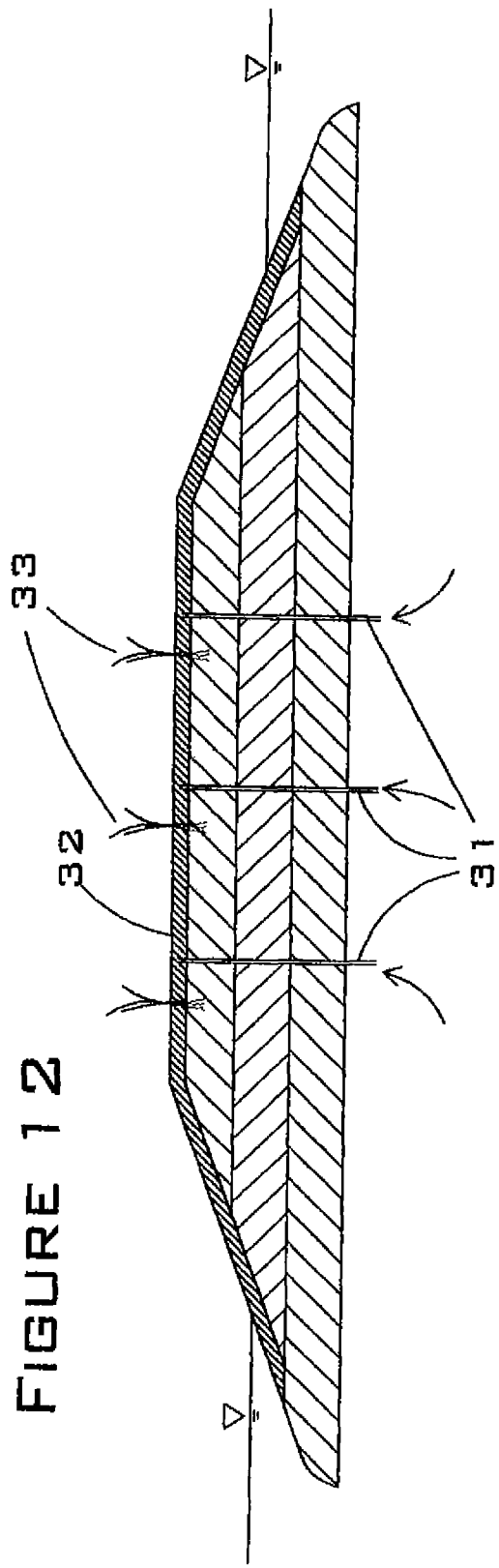
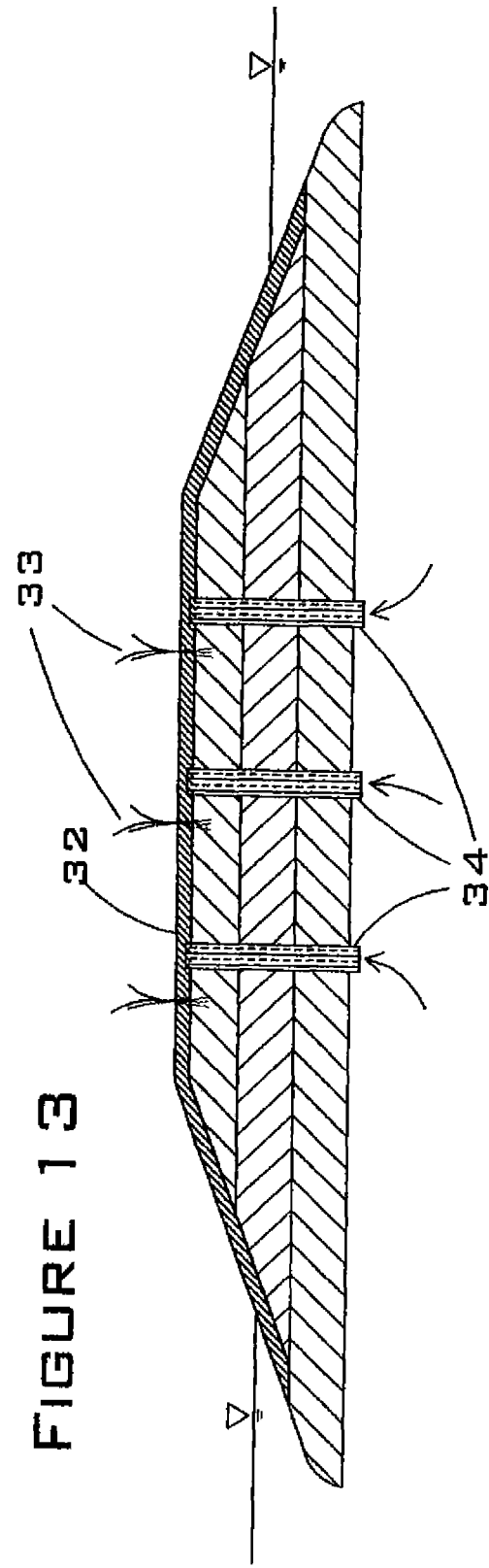
FIGURE 12
FIGURE 13

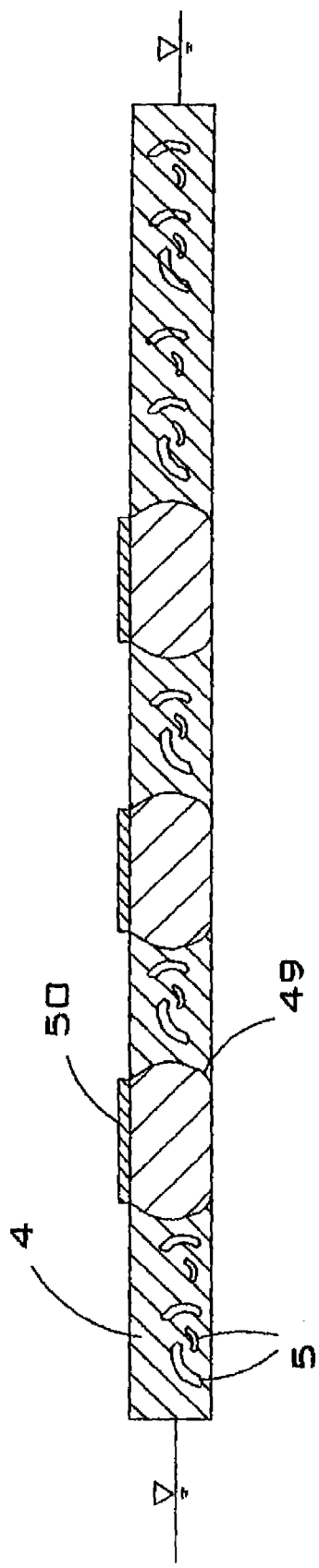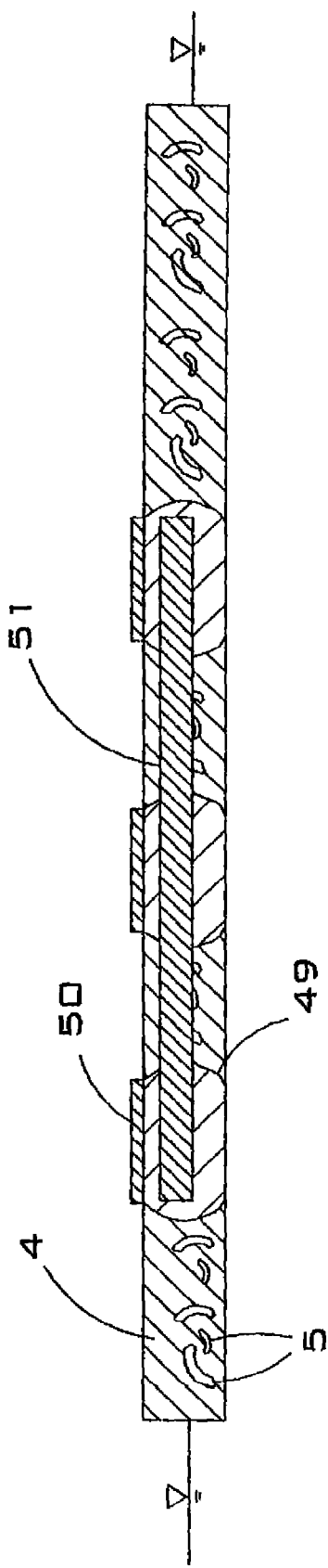

FIGURE 33
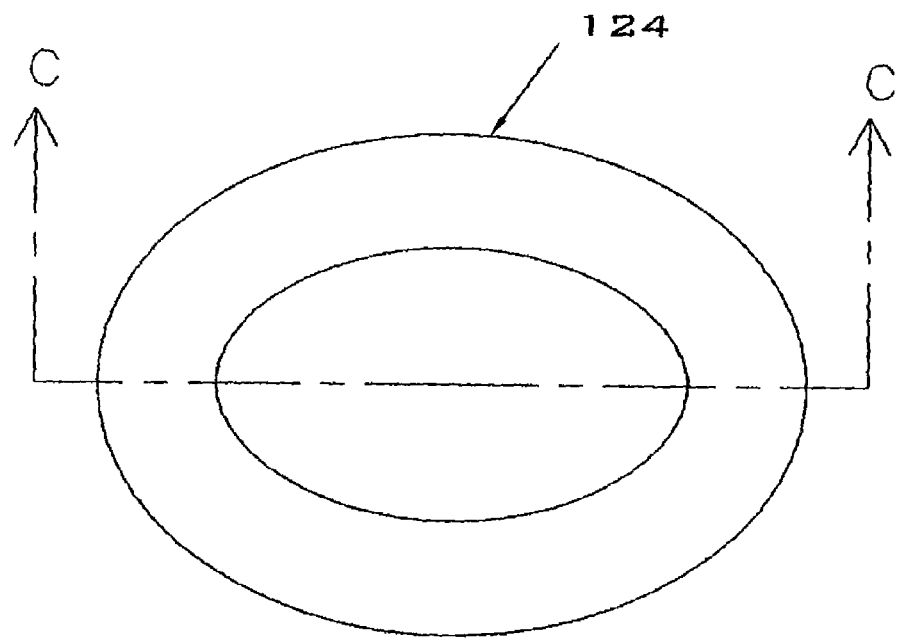
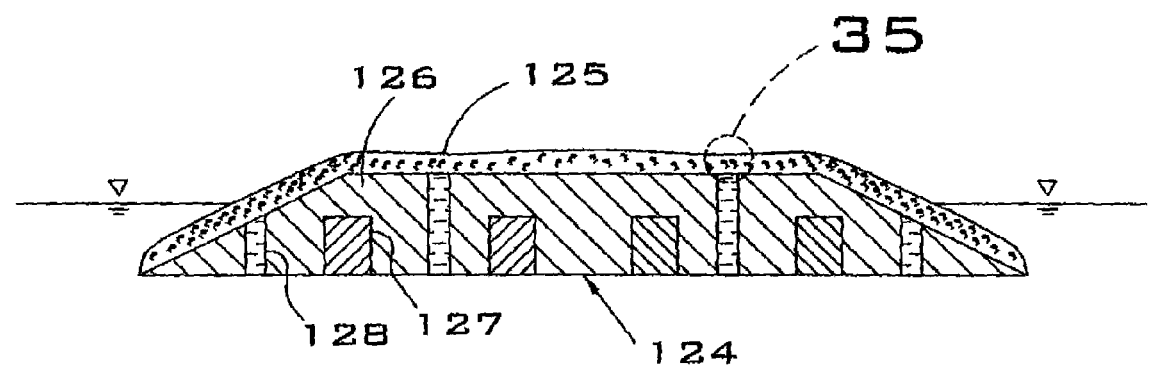
FIGURE 34

FIGURE 36
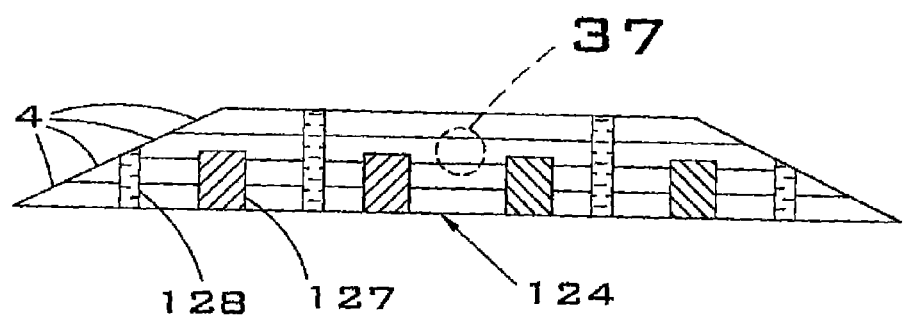
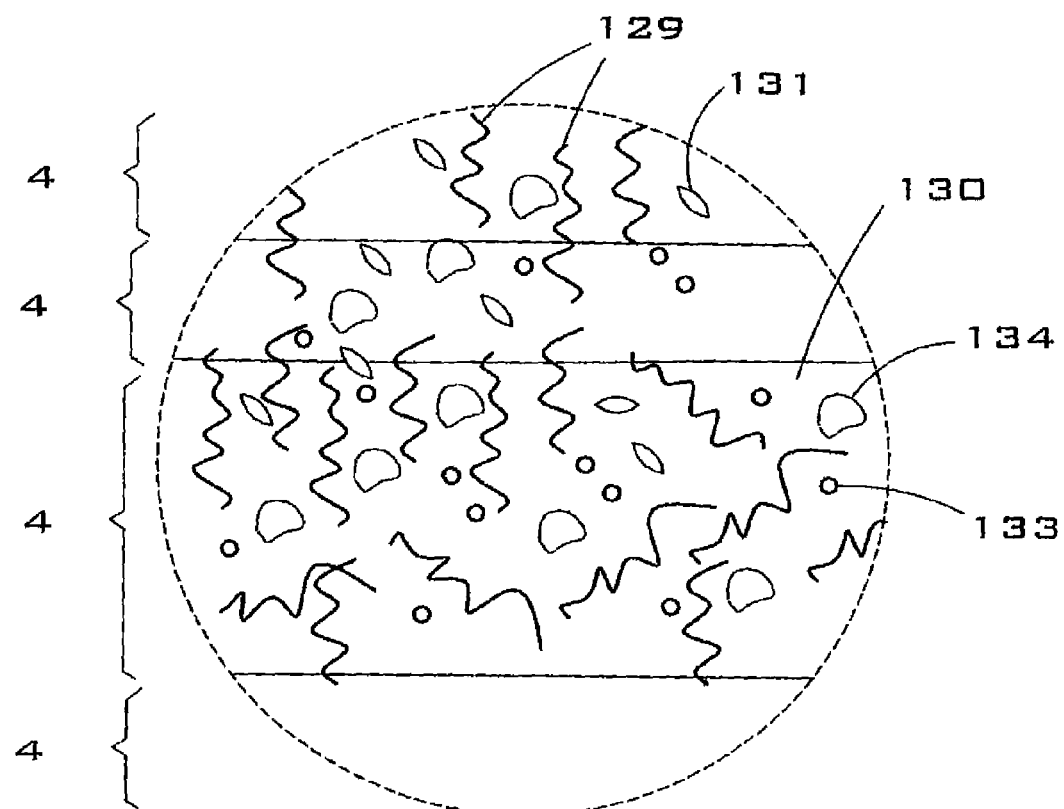
FIGURE 37

SUPER-ENHANCED, ADJUSTABLY BUOYANT FLOATING ISLAND

CROSS-REFERENCE TO RELATED APPLICATION

This application is a divisional of U.S. patent application Ser. No. 11/569,941 filed on Nov. 21, 2006.

BACKGROUND OF THE INVENTION

1. Field of the Invention

The present invention relates to a super-enhanced, adjustably buoyant floating island that can be deployed in ponds, lakes, rivers or any other body of water to monitor, regulate and improve water quality, enhance plant and animal life, and complement the natural surroundings.

2. Description of the Related Art

In bodies of water such as ponds and lakes, algae growth and the natural process of eutrophication can lead to an increase in land mass and corresponding decrease in water volume, the killing of fish and other organisms, and the diminishment of aesthetic appearance. Various floating mechanisms have been devised with the aim of purifying water, cultivating plants, dispensing fertilizer, or counteracting the effects of eutrophication. None of these inventions anticipates the combination of features provided by the present invention.

U.S. Pat. No. 5,799,440 (Ishikawa et al., 1998) discloses a floating island comprising: (i) a planter with holes in it to allow the roots of the plants to grow into the water and to supply water to the soil in the planter; and (ii) an oxygen-generating agent container attached to the bottom of the planter. The planter is made of a foamed resin with a reinforcing film of polyurethane elastomer on the surface. The invention also includes: (i) a layer of porous material on the inner surface of the bottom of the planter that has an aerobic microorganism immobilized in it; and (ii) a plant cultivation bag to hold the soil. In the preferred embodiment, the oxygen-generating agent is calcium peroxide, and the soil in the planter is covered with a net or fabric that is permeable to water and air and is not harmful to the plants. In addition to generating oxygen, calcium peroxide also eliminates phosphorus, thereby restricting algae growth.

U.S. Pat. No. 4,086,161 (Burton, 1978) sets forth an ecological system and method for counteracting the effects of eutrophication in bodies of water such as marshlands, inland ponds and lakes. The system uses clusters of bark fibers positioned in the upper, relatively oxygen-rich zones of such bodies of water. These bark clusters attract and hold excessive nutrient deposition in the form of colloidal wastes and aquatic algae and also provide a safe habitat for algae predators and feeders.

U.S. Pat. No. 6,086,755 (Tepper, 2000) provides a floating hydroponic biofiltration device for use in a body of water containing plant-eating fish. The invention includes a float, a mesh and a matting. The float contains an aperture devoid of soil in which a terrestrial plant is inserted. The mesh is at a substantial depth below the float and serves to enable passage of oxygenated water to the plant roots while excluding large plant-eating fish. The mesh also serves as a substrate surface for the growth of nitrogen-converting bacteria, which convert the ammonia of fish waste to nitrates useful to plants. The matting anchors the plant roots and partially excludes plant-eating fish from a portion of the plant roots. In the preferred embodiment, the mesh and matting are formed of plastic.

U.S. Pat. Nos. 5,766,474 (Smith et al., 1998) and 5,528,856 (Smith et al., 1996) set forth a biomass impoundment management system that uses sunlight to purify water. The main purpose of this invention is to control impurities in water impoundments, such as ammonia, nitrogen, phosphorous and heavy metals. It is well known that nitrogen and phosphorous are a primary food source for various undesirable algae species, and ammonia and heavy metals are toxic to humans, fish and other organisms. This invention aims to purify water by allowing rooted bottom dwelling plants to grow and remain healthy on the bottom of a water impoundment while allowing rootless floating plants to grow and remain healthy above them. The non-rooted, floating plants are contained in a large surface area provided by elongated channels, which are oriented in a North-South direction to take full advantage of the sun. The elongated channels are designed to take advantage of wave activity to increase productivity.

U.S. Pat. No. 5,337,516 (Hondulas, 1994) sets forth an apparatus for treating waste water that includes a waste water basin and a number of wetland plants in floating containers. The idea underlying this invention is that the root systems of the wetland plants will treat the waste water. The extent of growth of the root systems is controlled by an adjustable platform associated with each floating container, so that the aerobic and anaerobic zones within the waste water basin are controlled and can be adjusted or varied as required. Similarly, U.S. Pat. No. 5,106,504 (Murray, 1992) covers an artificial water impoundment system designed to remove biologically fixable pollutants from urban or industrial waste water using aquatic plants to absorb pollutants.

U.S. Pat. No. 4,536,988 (Hogen, 1985) relates to a floating containment barrier grid structure for the containment of floating aquatic plants in a body of water. This invention is designed to facilitate the commercial cultivation and harvesting of aquatic plants. The grid structure consists of elongated flexible sheets that are interconnected at spaced intervals along their longitudinal axes to form a plurality of barrier sections in a web-like arrangement. Through the use of an anchoring means, the barrier grid is tensioned so that certain portions of the structure are submerged beneath the surface of the water by a device that harvests the floating aquatic plants.

U.S. Pat. Nos. 4,037,360 (Farnsworth, 1977) and 3,927,491 (Farnsworth, 1975) disclose a raft apparatus for growing plants by means of water culture or hydroponics. The raft floats on a nutrient solution, and buoyancy of the rafts is increased during plant growth by placing a small raft on a larger raft or on auxiliary buoyancy means. U.S. Pat. No. 5,261,185 (Kolde et al., 1973) also involves an apparatus floating on a nutrient solution. In this invention, rafts are floated in a water culture tank filled with nutrient solution, plant containers are inserted in vertically oriented channels in the raft, and the plants are cultivated by gradually moving the raft from one end of the water culture tank to another.

U.S. Pat. No. 4,487,588 (Lewis, III et al., 1984) addresses a submersible raft for the cultivation of plant life such as endangered sea grasses. The raft is manufactured from standard polyvinyl chloride tubing and fittings.

U.S. Pat. No. 6,014,838 (Asher, 2000) discloses a simple floatable unit for decorative vegetation. U.S. Pat. No. 5,836,108 (Scheuer, 1998) describes a floating planter box comprising a polyhedral planar base member of a synthetic foam resin less dense than water and an optional anchoring means.

U.S. Pat. Nos. 5,312,601 (Patrick, 1994) and 5,143,020 (Patrick, 1992) involve a simple apparatus for dispensing fertilizer in a pond. The invention consists of a flotation structure surrounded by a porous material such as a net sack and an opening in the flotation structure through which fertilizer is dumped. The fertilizer is dissolved by water flowing through the net sack at the bottom of the flotation structure.

U.S. Patent Application Pub. No. US 2003/0208954 (Bulk) relates to a floating planter for plants and fish. The planter is made of closed cell plastic foam and includes recesses for above-water pot holders and a floating underside support for oxygenating underwater plants. The island has passageways downward through the island structure that open into the water and allow plant roots to reach the water. The island also has cavities that function as shelter for amphibious creatures such as frogs.

In addition to the patents and patent application discussed above, there are a number of patents and at least one published patent application that deal with growth medium for plants. For example, U.S. Pat. No. 5,207,733 (Perrin, 1993) involves the use of a low-density, rigid, unicellular (i.e., closed cell) expanded polyurethane foam that is perforated to facilitate the passage of emergent plant roots and to provide voids for water absorption and retention.

U.S. Pat. No. 2,639,549 (Wubben et al., 1953) describes a hydroponic growth medium that comprises a gravel bed that rests on a perforated bottom, which in turn rests on top of a ridged ground plate. A pump and gutters are used to circulate a nutrient solution throughout the gravel bed.

U.S. Pat. No. 5,224,292 (Anton, 1993) discloses a growth medium that consists of a layer of hollow nonwoven polyester fibers, wherein the lumens (or hollow insides) of the fibers contain a plant adjuvant (or something that assists plant growth), such as plant nutrients, fungicides, algaecides, weed killers and pesticides.

U.S. Pat. No. 6,615,539 (Obonai et al., 2003) provides a water-retaining support comprised of a hydrogel-forming polymer that is used as a plant growth medium. The object of the Obonai invention was to provide a hydrogel that would retain water without inhibiting plant root growth.

U.S. Patent Application Pub. No. US 2003/0051398 (Kosinski) involves a soil substitute that consists of fiberballs made of a biodegradable polymer fiber (for example, polyester) with a specific cut length and average dimension. The patent application includes a claim for a method of supporting plant growth by contacting plant material with the fiberball growth medium.

BRIEF SUMMARY OF THE INVENTION

The present invention covers several different embodiments of a floating island comprising one or more layers of nonwoven mesh material. The present invention can be deployed in ponds, lakes, rivers or any other body of water to improve water quality, enhance plant and animal life, and complement the natural surroundings. Larger embodiments of the present invention may help prevent the greenhouse effect through carbon sequestration, which involves the removal of carbon dioxide from the atmosphere and the conversion of carbon to biomass. The larger embodiments of the present invention may also be used for farming or even habitation on or in bodies of water.

The nonwoven mesh material of the present invention can be coated with a spray-on elastomer, inoculated with nutrients, or inoculated with aerobic or anaerobic microorganisms. The floating island can also comprise buoyant nodules that are manufactured into the mesh material or integrated into the mesh material during assembly. The layers of mesh material can be joined together by an adhesive, and holes can be formed into the top layer or layers for plants or flotation materials. The island can include floats, buoyant blocks, a dunking feature, capillary tubes and/or wicking units. It can also include a top cover that is optionally biodegradable and that protects seeds that are either integrated into the top cover or placed underneath it.

In an alternate embodiment, the floating island includes bell flotation units comprising an air compressor, tubing, a solenoid valve, a control wire and one or more bells. The bells can be formed of thermoplastic, closed cell foamed metal, amorphous metal, cement or plastic.

The present invention also includes a larger embodiment that can bear the weight of one or more people. This larger embodiment is comprised of at least one layer of nonwoven mesh material, buoyant nodules, supplemental flotation units and stepping pads. This embodiment optionally includes one or more load distribution members or an adjustably buoyant framework comprising prefabricated flotation tubes and cross members. Other optional features include a stepping stone flotation assembly, a stepping stone/vertical buoyant member flotation assembly, and a floating log assembly. The buoyancy of the island can be adjusted with a rigid framework that comprises one or more horizontal members and, optionally, a water tube, an air control valve, and an air tube. The island can also include upper and lower vertical members that can be moved vertically within the island to further adjust its buoyancy.

The present invention also covers a floating island with a boat docking location that is shaped so that the docked boat is mostly surrounded by island material. Low abrasion padding can be placed around the inner perimeter of the boat docking location to provide extra protection for the boat hull.

Any of the embodiments of the present invention can be supplemented with additional island modules that are comprised of a single layer of nonwoven mesh material impregnated with buoyant material.

The present invention also includes a prefabricated seed blanket that can be used to seed the island. It also includes a bonded growth medium for use in connection with the floating island of the present invention and several methods of manufacturing a floating island with the bonded growth medium of the present invention.

The present invention encompasses a method of attaching various layers of nonwoven mesh material, a method of forming holes in the nonwoven mesh material, and a method of fabricating a floating island from scrap pieces of nonwoven mesh material. It also includes a method of constructing floating islands by creating multiple island cutouts from the nonwoven mesh material.

BRIEF DESCRIPTION OF THE DRAWINGS

FIG. 12 is a section view of the island with optional "capillary action" features.

FIG. 13 is a section view of the island with optional "wicking action" features.

FIG. 17 is a section view of a first alternative embodiment of a floating island designed to support the weight of one or more persons.

FIG. 18 is a section view of a second alternative embodiment of a floating island designed to support the weight of one or more persons.

FIG. 33 is a top view of a floating island with bonded growth medium, shown prior to plant growth.

FIG. 34 is a section view of the first embodiment of the bonded growth medium taken at section C-C of FIG. 31, in which the bonded growth medium is attached to the outer surface of the floating island.

FIG. 36 is a section view of a floating island comprised of individual layers of nonwoven mesh material that have been stacked and bonded together.

FIG. 37 is a magnified view of a portion of FIG. 34, showing the components of the embedded bonded growth medium.

Figure 1:
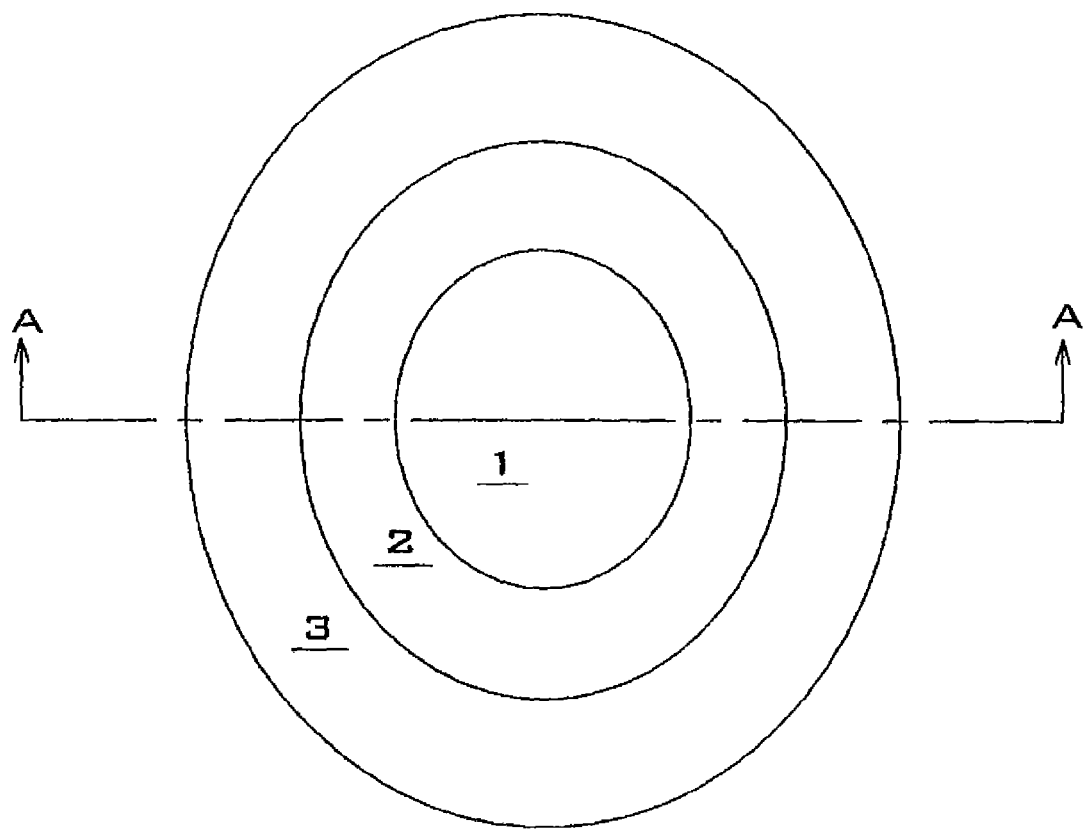
FIG. 1 is a top view of the nonwoven mesh embodiment of the present invention.

| REFERENCE NUMBERS | |
|---|---|
| 1 | Top layer (nonwoven mesh embodiment) |
| 2 | Middle layer (nonwoven mesh embodiment) |
| 3 | Bottom layer (nonwoven mesh embodiment) |
| 4 | Nonwoven mesh material |
| 5 | Buoyant nodules (nonwoven mesh embodiment) |
| 6 | Cut holes |
| 7 | Potted plant units |
| 8 | Adhesive |
| 9 | Floats |
| 10 | Foam sealant |
| 11 | Buoyant blocks |
| 12 | Landscaping pin |
| 13 | Bent end section of landscaping pin |
| 14 | Steel spike |
| 15 | Head end of steel spike |
| 16 | Lower end of steel spike |
| 17 | Electric or compressed air drill |
| 18 | Mandrel |
| 19 | Scrap pieces of mesh material |
| 20 | Outer covering |
| 21 | Tightly packed nonwoven mesh |
| 22 | Loosely packed nonwoven mesh |
| 23 | Small fish or baitfish |
| 24 | Large predator fish |
| 25 | Buoyant spacers |
| 26 | Water pockets |
| 27 | Flexible line |
| 28 | Pulley |
| 29 | Anchor block |
| 30 | Island (dunking embodiment) |
| 31 | Capillary tubes |
| 32 | Absorbent top cover |
| 33 | Plants growing above waterline |
| 34 | Wicking units |
| 35 | Floating island ("bell" embodiment) |
| 36 | Compressor |
| 37 | Tubing |
| 38 | Solenoid valve |
| 39 | Control wire |
| 40 | Bell (flotation) |
| 41 | Internal space |
| 42 | Pond water level |
| 43 | Seed blanket |
| 44 | Lower seed-containment layer |
| 45 | Middle composite seed layer |
| 46 | Upper seed-containment layer |
| 47 | Aquatic plant seeds |
| 48 | Binder |
| 49 | Supplemental flotation unit |
| 50 | Stepping pad |
| 51 | Load distribution member |
| 52 | Artificial stepping stone |
| 53 | Artificial tree limb |
| 54 | Stepping stone flotation assembly |
| 55 | Lower stepping stone |
| 56 | Upper stepping stone |
| 57 | Connecting cable unit |
| 58 | Island body (generic) |

-continued

| | REFERENCE NUMBERS | |
|---|---|---|
| 59 | Stepping stone/vertical buoyant member assembly | |
| 60 | Vertical buoyant member | |
| 61 | Floating tree limb assembly | |
| 62 | Lower artificial tree limb | |
| 63 | Upper artificial tree limb | |
| 64 | Variable buoyancy, rigid framework | |
| 65 | Horizontal members | |
| 66 | Water tube | |
| 67 | Air control valve | |
| 68 | Air tube | |
| 69 | Perforated pipe | |
| 70 | Inflatable bag | |
| 71 | Holes in perforated pipe | |
| 72 | Lower vertical member | |
| 73 | Upper vertical member | |
| 74 | Watertight cap | |
| 75 | Collar | |
| 76 | Locking pin | |
| 77 | Locking pin holes | |
| 78 | Locking straps | |
| 79 | Wheel | |
| 80 | Skid | |
| 81 | Prefabricated flotation tube | |
| 82 | Prefabricated cross members | |
| 83 | Protective pipe | |
| 84 | Strap | |
| 85 | Pipe positioning device | |
| 86 | Attachment post | |
| 87 | Flotation unit (single attachment point) | |
| 88 | Barbed attachment spike | |
| 89 | Float (single attachment point flotation unit embodiment) | |
| 90 | Buoyant feature | |
| 91 | Retaining pin | |
| 92 | Dual-ring buoy | |
| 93 | Snap-on connector | |
| 94 | Fully penetrating receiver unit | |
| 95 | Pipe (receiver unit) | |
| 96 | Lower flange | |
| 97 | Upper flange | |
| 98 | Partially penetrating receiver unit | |
| 99 | Protective floating structure | |
| 100 | Shoreline | |
| 101 | Waves | |
| 102 | Identical mass-produced islands | |
| 103 | Connectors (modular island) | |
| 104 | Modular island structure | |
| 105 | First island in multiple cutout design | |
| 106 | Second island in multiple cutout design | |
| 107 | Central opening within first island | |
| 108 | Third island in multiple cutout design | |
| 109 | Central opening within second island | |
| 110 | Skeleton frame island | |
| 111 | Skeleton frame | |
| 112 | Floor | |
| 113 | Divider | |
| 114 | Buoyant intrusions (skeleton island) | |
| 115 | Soil growth medium | |
| 116 | Soil-based plants | |
| 117 | Matrix-based plants | |
| 118 | Natural organic material | |
| 119 | Synthetic organic material | |
| 120 | First growth compartment | |
| 121 | Second growth compartment | |
| 122 | Prefabricated planter unit | |
| 123 | Shell (prefabricated planter unit) | |
| 124 | Island comprising bonded growth medium | |
| 125 | Bonded growth medium | |
| 126 | Porous matrix (bonded growth medium embodiment) | |
| 127 | Buoyant inclusions (bonded growth medium embodiment) | |
| 128 | Capillary channels (bonded growth medium embodiment) | |
| 129 | Peat fibers (or similar material) | |
| 130 | Binder | |
| 131 | Embedded seeds | |
| 132 | Topcoat seeds | |
| 133 | Nutrient particles | |
| 134 | Buoyant pellets | |
| 135 | Infiltration zone | |
| 136 | Floating island with pumped water distribution system | |
| 137 | Water distribution system | |
| 138 | Water pump | |
| 139 | Distribution pipes | |
| 140 | Nonwoven mesh island body (pumped filtration embodiment) | |
| 141 | Aquatic plants selected for nutrient uptake | |
| 142 | Enclosure tray | |
| 143 | Air bubbles | |
| 144 | Perforations (tray) | |
| 145 | Floating island (boat docking embodiment) | |
| 147 | Low-abrasion padding | |
| 148 | Anchor optimized for multiple wind directions | |
| 149 | Barb (anchor) | |
| 150 | Ring attachment point (anchor) | |

DETAILED DESCRIPTION OF THE INVENTION

The present invention is superior to any existing floating island-type technology because it provides a super-enhanced habitat for plants, improves water quality, discourages algae populations, slows the process of eutrophication, provides a habitat for fish and small animals, and is designed to be aesthetically pleasing. It is distinguishable from any of the patents reviewed above because it is designed to enhance the existing natural plant and animal habitat. Installation of the present invention does not require the draining of water, construction of a submerged substructure, fitting or alteration of a pond liner, or disturbance of existing flora or fauna. By virtue of its design, the present invention results in only minimal water displacement, which allows the pond or other water body to retain its carrying capacity and does not adversely affect the health of the water body.

In a natural floating island, the roots of living plants are supported in a substrate composed mainly of other living roots, dead roots, and partially decomposed organic materials derived from dead plants and microbes. This natural substrate is mimicked by the island matrix of the present invention, whose rigid structure and porosity provide an ideal environment for the establishment of growing roots.

In a natural floating island, microbial gas production provides a contribution to island buoyancy. In the present invention, the matrix fibers (nonwoven mesh) provide a large surface area for naturally occurring and introduced microbes that convert pond nutrients into gasses that provide buoyancy.

In a natural floating island, the plants that have adapted successfully for island life generally provide their own buoyancy. For example, a fifty-foot tall larch tree can survive on a natural floating island because the buoyancy of the island in the vicinity of the tree is sufficient to support the weight of the tree; while a short distance away, the buoyancy of the island is only adequate to support the weight of two-foot tall leatherleaf plants. In each case, the plant roots and the biological community surrounding the roots provide adequate buoyancy to support the weight that is imposed by the above-water portion of the plant. Plants that cannot support their own weight are generally sparse on natural floating islands. In the present invention, plants with known self-generating buoyancy can be selected for use on islands where long-term, self-sustaining buoyancy is required.

In a preferred embodiment of the present invention, the floating island is comprised of a nonwoven mesh material. This embodiment is shown in FIGS. 1-5. The island shape in FIGS. 1-5 is shown to be elliptical in plan view, but in fact can take any regular or freeform shape. In any of the nonwoven mesh embodiments, the mesh material can be coated with a "soft-touch coating" comprised of a spray-on elastomer such as latex or polyurethane. The purpose of the coating is to provide a less abrasive or non-abrasive finish, and it can be applied in varying thickness depending upon the effect desired.

Figure 2:
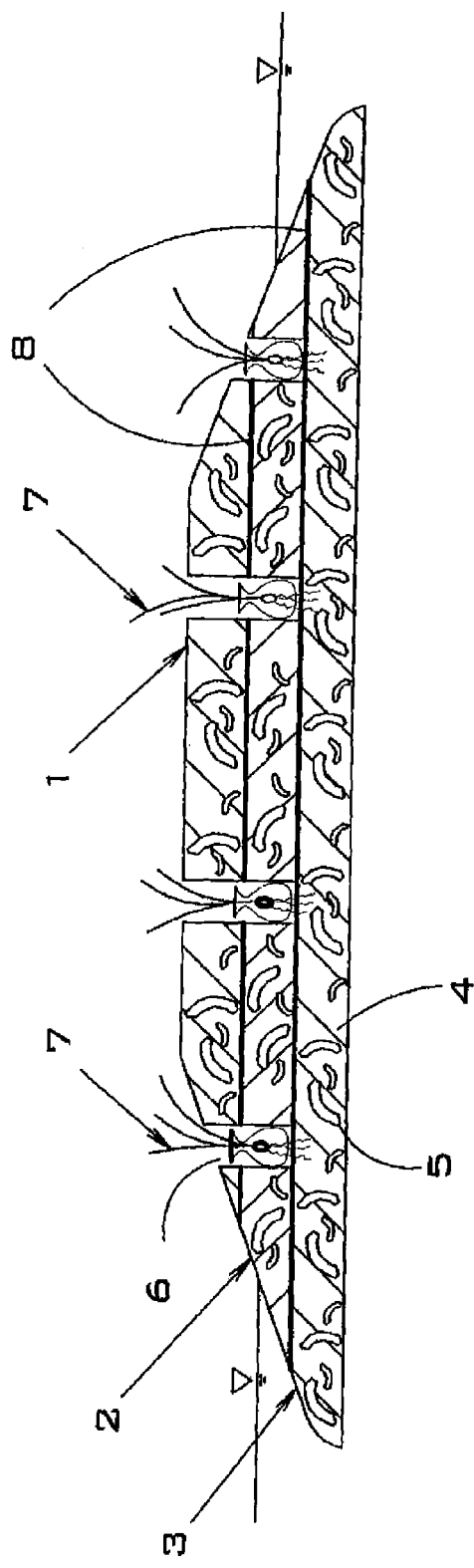
FIG. 2 is a section view of FIG. 1 taken at A-A showing a first embodiment of the nonwoven mesh island.

FIG. 1 is a top view of the nonwoven mesh embodiment of the present invention, which comprises a top layer 1, a middle layer 2, and a bottom layer 3. FIG. 2 is a section view of FIG. 1 taken at A-A showing a first embodiment of the nonwoven mesh island. Each of the layers 1, 2, 3 is comprised of water-permeable, nonwoven mesh material 4 (such as POLY-FLO filter material) that has buoyant nodules 5 manufactured into the mesh. The buoyant nodules 5 may be comprised of any suitable low-density material, such as closed cell polymer foam, polystyrene, cork, or hollow plastic balls. Holes 6 are cut into the top layer 1 and middle layer 2, and a potted plant unit 7 is installed in each hole. The layers are joined together with adhesive 8. The adhesive 8 may be any suitable material, such as hot-melt glue or polyurethane foam sealant (such as Dow Chemical's GREAT STUFF or FROTH-PAC foam sealant). The foam may alternately be comprised of organic material, for example, soy-based foam, as described in the *Journal of American Oil Chemists' Society*, Vol. 76, No. 10 (October 1999). The foam sealant provides buoyancy, adhesion and rigidity to the structure. The buoyancy of the island can be adjusted after installation by adding additional foam as required.

Figure 3:
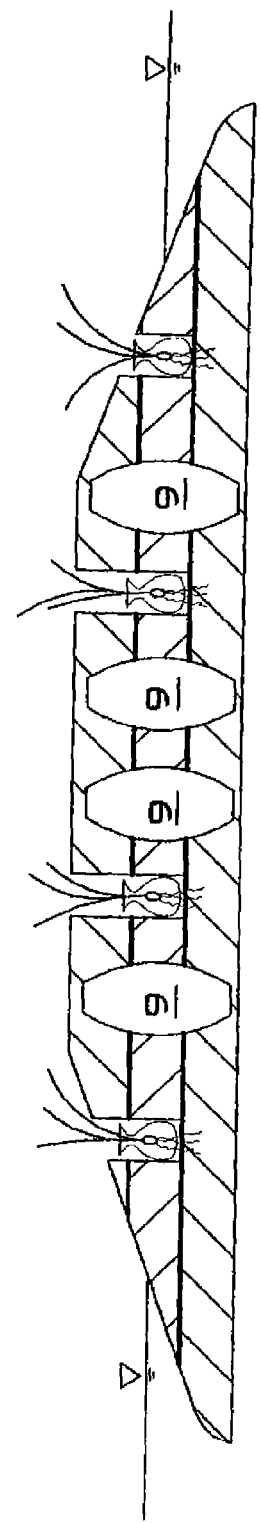
FIG. 3 is a section view of FIG. 1 taken at A-A showing a second embodiment of the nonwoven mesh island.

FIG. 3 is a section view of FIG. 1 taken at A-A showing a second embodiment of the nonwoven mesh island. This embodiment is comprised of multiple layers of nonwoven polyester mesh, similar to what is shown in FIG. 2, except that flotation for this second embodiment is provided by floats 9 that are installed into the embodiment during assembly of the layers. The floats 9 may be made of any suitable material, such as hard plastic or plastic foam fish net floats.

Figure 4:
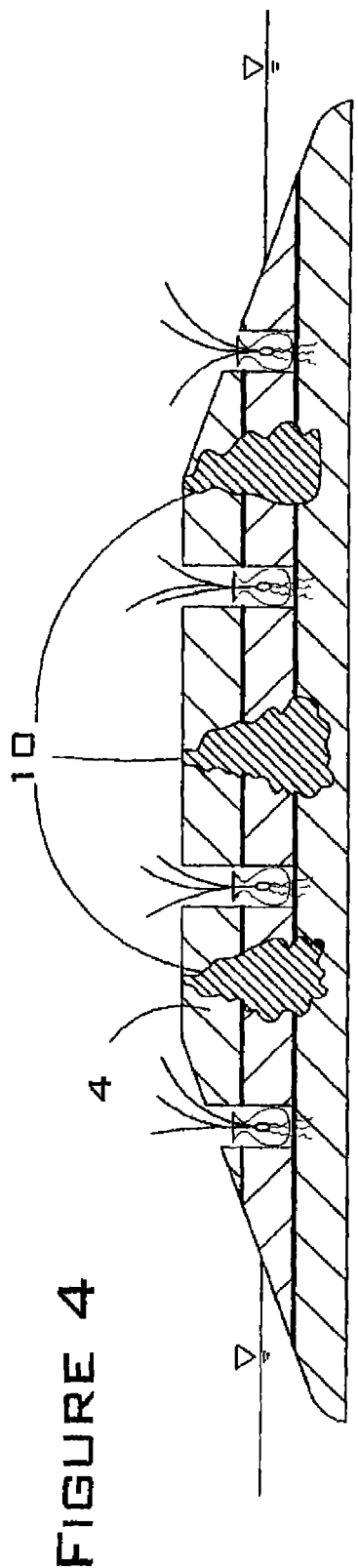
FIG. 4 is a section view of FIG. 1 taken at A-A showing a third embodiment of the nonwoven mesh island.

FIG. 4 is a section view of FIG. 1 taken at A-A showing a third embodiment of the nonwoven mesh island. This embodiment is comprised of multiple layers of nonwoven polyester mesh, similar to what is shown in FIG. 2, except that flotation for the third embodiment is provided by expanding foam sealant 10 (such as Dow Chemical's GREAT STUFF or FROTH-PAC foam sealant). The foam sealant 10 is injected as a pressurized liquid into and through the fibers of the nonwoven mesh material 4. In addition to providing flotation, the foam sealant 10 also bonds the layers together.

Figure 5:
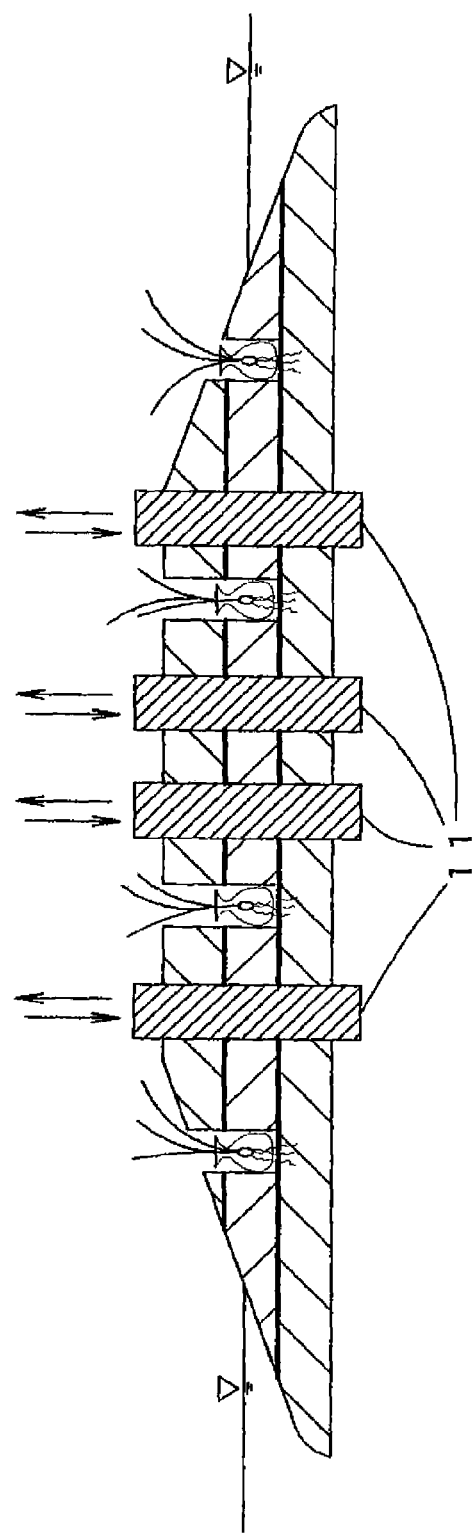
FIG. 5 is a section view of FIG. 1 taken at A-A showing a fourth embodiment of the nonwoven mesh island.

FIG. 5 is a section view of FIG. 1 taken at A-A showing a fourth embodiment of the nonwoven mesh island. This embodiment is comprised of multiple layers of nonwoven polyester mesh, similar to what is shown in FIG. 2, except that flotation for the fourth embodiment is provided by buoyant blocks 11. The buoyant blocks 11 are inserted into holes (not shown) that are cut through the layers of nonwoven material. The buoyant blocks 11 may be retained within the holes by a friction-tight fit, and they may be manually adjusted in the vertical direction (as indicated by the arrows). This feature is particularly useful for adjusting the buoyancy of the island to compensate for the changing weight of growing plants. Both the floats of FIG. 3 and the buoyant blocks of FIG. 5 may be optionally perforated to provide additional pathways for plant roots.

Figure 6:
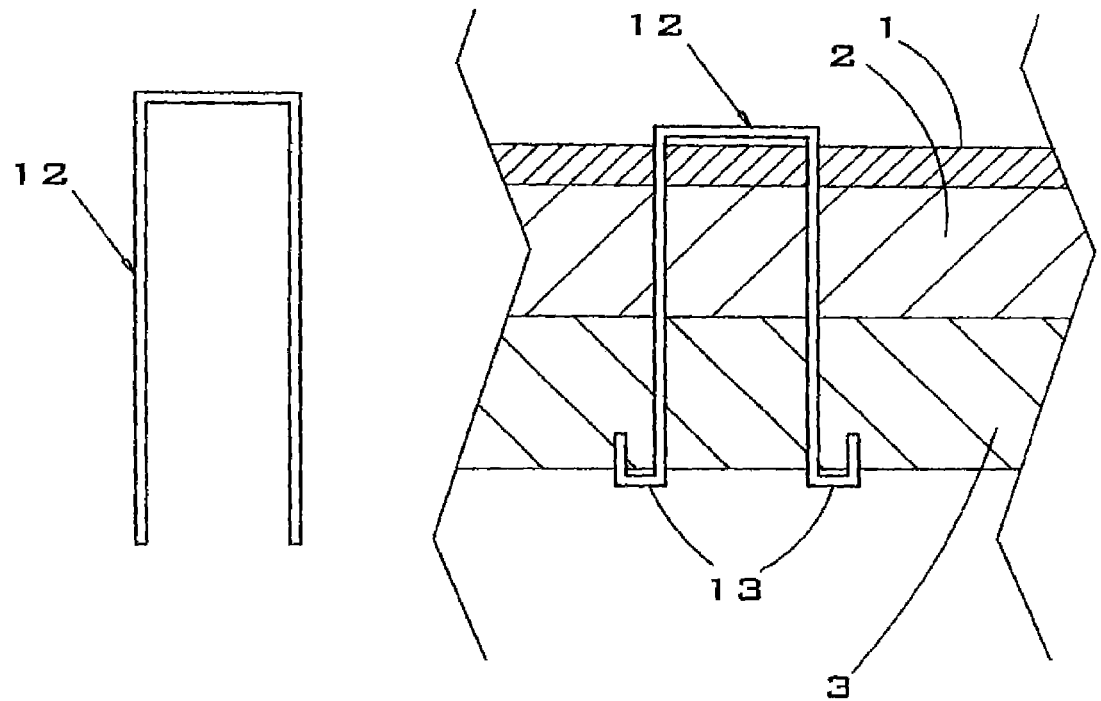
FIG. 6 is a side view of a landscaping pin and a partial section view of a multi-layered island showing a method of attaching the layers with a modified landscaping pin.

In FIG. 1, the island is shown as being comprised of three layers. In practice, the present invention may be comprised of a single layer or any number of multiple layers. FIG. 6 illustrates a method of attaching the layers of nonwoven mesh. In FIG. 6, a standard landscaping pin 12 is pushed through a top layer 1, a middle layer 2, and a bottom layer 3. The end sections 13 of the pin 12 are then bent upwards into U-shapes as shown and allowed to penetrate the bottom layer 3 in a second location as shown. In this configuration, the landscaping pin 12 locks the layers together. One example of a commercially available landscaping pin is the eight-inch wire staple sold by North American Green of Evansville, Ind.

Figure 7:
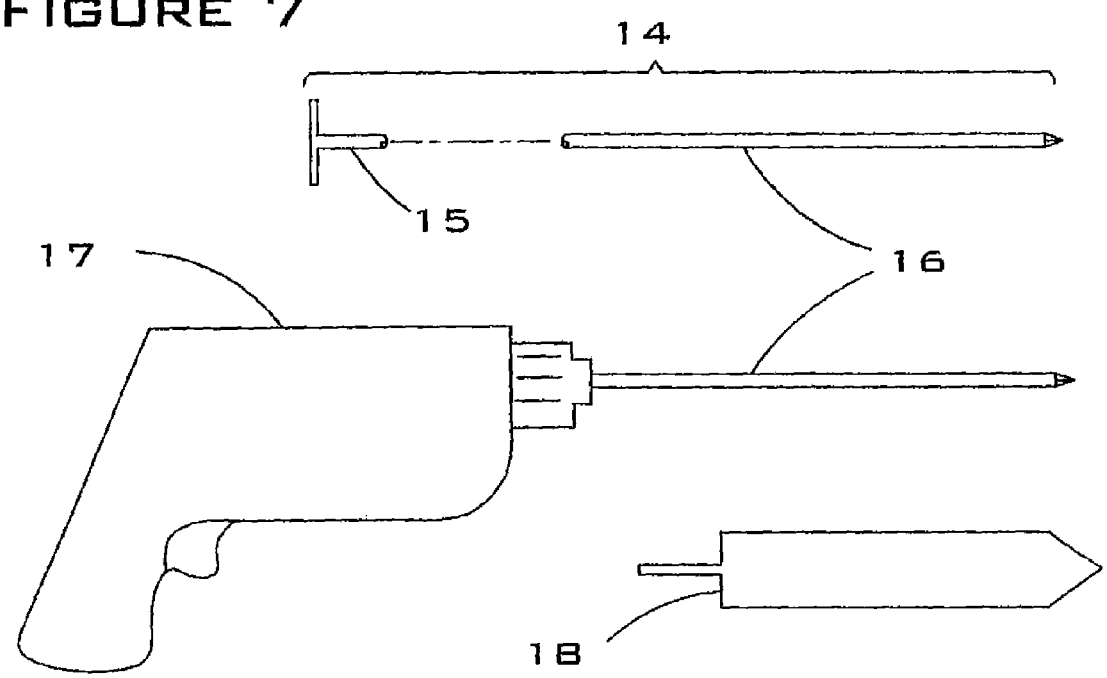
FIG. 7 is a side view of an apparatus used for opening holes into nonwoven mesh material without cutting or melting the mesh fibers.

With respect to the embodiments shown in FIGS. 1-5, apertures for containing plants or flotation materials may optionally be cut, melted or otherwise formed into the mesh material during manufacture. A preferred method of forming apertures in the nonwoven mesh material is illustrated in FIG. 7. In this figure, a hole-opening tool is fashioned from a steel spike 14 by cutting the head 15 off the spike 14. The lower section 16 of the spike is then inserted into a standard electric or air-powered drill 17. The lower section 16 is round in cross section, with a pyramid or cone-shaped end. The apparatus comprised of the drill 17 and lower section 16 is used to open holes into layers of nonwoven mesh by pushing the lower section 16 through the nonwoven mesh while rotating lower section 16 with the drill 17. The resulting cylindrically shaped holes can be used to inject adhesive foam or to install plants and seeds. If desired, a hole can be kept open by temporarily inserting another steel spike 14 into the hole, until the adhesive, plant, or seed is installed.

This method of producing an opening in the mesh is superior to cutting a hole because it requires much less effort, is faster, and produces a temporary hole that contracts around any installed adhesive, plant, or seed. This method is superior to melting a hole because it does not produce noxious fumes. An example of a suitable steel spike is ⅜-inch in diameter and 12 inches in length, available from McMaster-Carr (part number 97033A320). Larger diameter holes may be opened by substituting a custom manufactured mandrel 18 for the lower section 16. Such larger holes may be useful for installing rooted plants.

All of the embodiments depicted in FIGS. 1-5 share the same advantage in terms of biological filtration. The nonwoven mesh material acts as a biological filter media in that it provides an ideal substrate for bacterial colonization and allows the free passage of water through the media. The bacteria form beneficial biofilms and enhance the removal of nitrate, phosphorous and other undesirable nutrients as the pond water passes through the media. This microbial bio-removal of nutrients, along with nutrient uptake by plants growing on the island, provides significant nutrient removal from pond water and thereby improves overall pond health. As the microbes utilize nutrients and multiply, some of these microbes become detached from the island matrix and are dispersed throughout the pond, where they continue to remove nutrients. By this dispersal means, the island acts as microbial "seed source" to provide nutrient-removal microbes throughout the pond. The rate of nutrient removal is dependent upon the flow rate or hydraulic loading that the floating island experiences. The pond water could be pumped and sprayed over the island, which would increase the mass removal rate for pond water nutrients (including the possibility for actually filtering out algae). The island could be inoculated with aerobic or anaerobic microorganisms, plus start-up nutrients, in order to provide for enhanced nutrient uptake from the pond. A wind-powered, wave-powered or solar-powered pump or similar mechanism could be added to increase the rate of water flow through the filter media. All of the above would enhance the performance of the island as a floating biofilter. Additional embodiments that take advantage of these unique capabilities of the nonwoven mesh material of the present invention are described below.

Figure 8:
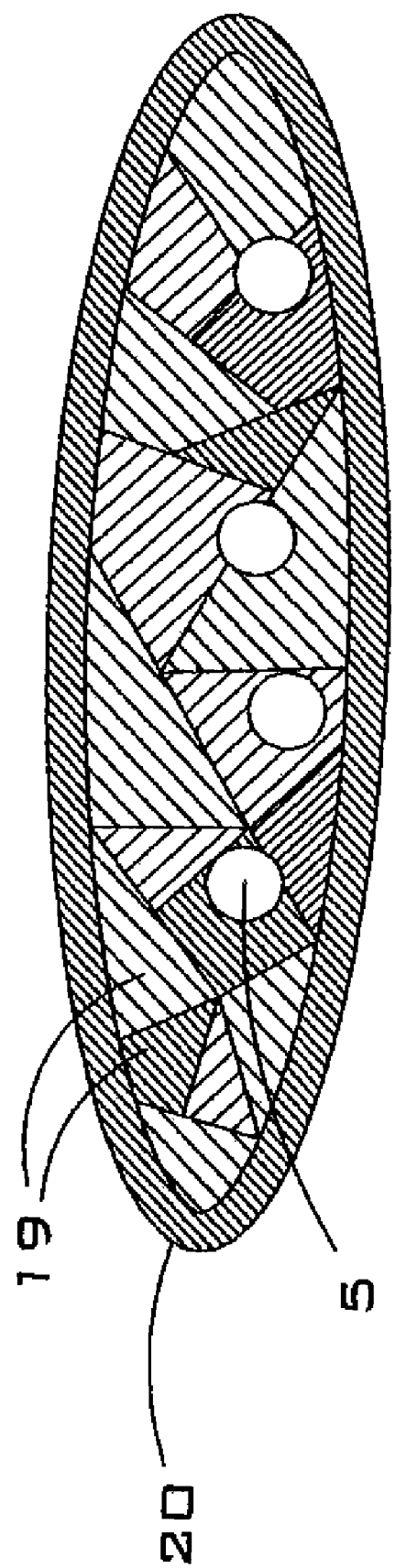
FIG. 8 is a schematic illustration of a floating island fabricated from scrap pieces of nonwoven mesh material.

FIG. 8 shows a floating island comprised of scrap pieces of nonwoven mesh material 19, buoyant nodules 5, and an outer covering 20. The outer covering 20 may be fabricated by placing a bundle of mesh pieces 19 into a heatable mold (not shown). When the mold is heated to the melting point of the nonwoven mesh material (e.g., approximately 400° F. for polyester), the outer fibers of the bundle soften and fuse, forming a porous "skin" around the unmelted center pieces of mesh material. The skin forms an outer covering 20 that confines the pieces of mesh material 19, while allowing water, plant stems, and plant roots to penetrate. In an alternative method, the outer fibers of the bundle are softened and fused by applying a suitable solvent (e.g., di-octyl phosphate is a solvent for polyvinyl chloride mesh). Alternately, both heat and solvents may be simultaneously applied to form an outer skin on the bundle of mesh material. The outer covering 20 may also be comprised of a separate material, such as nylon netting.

Figure 9:
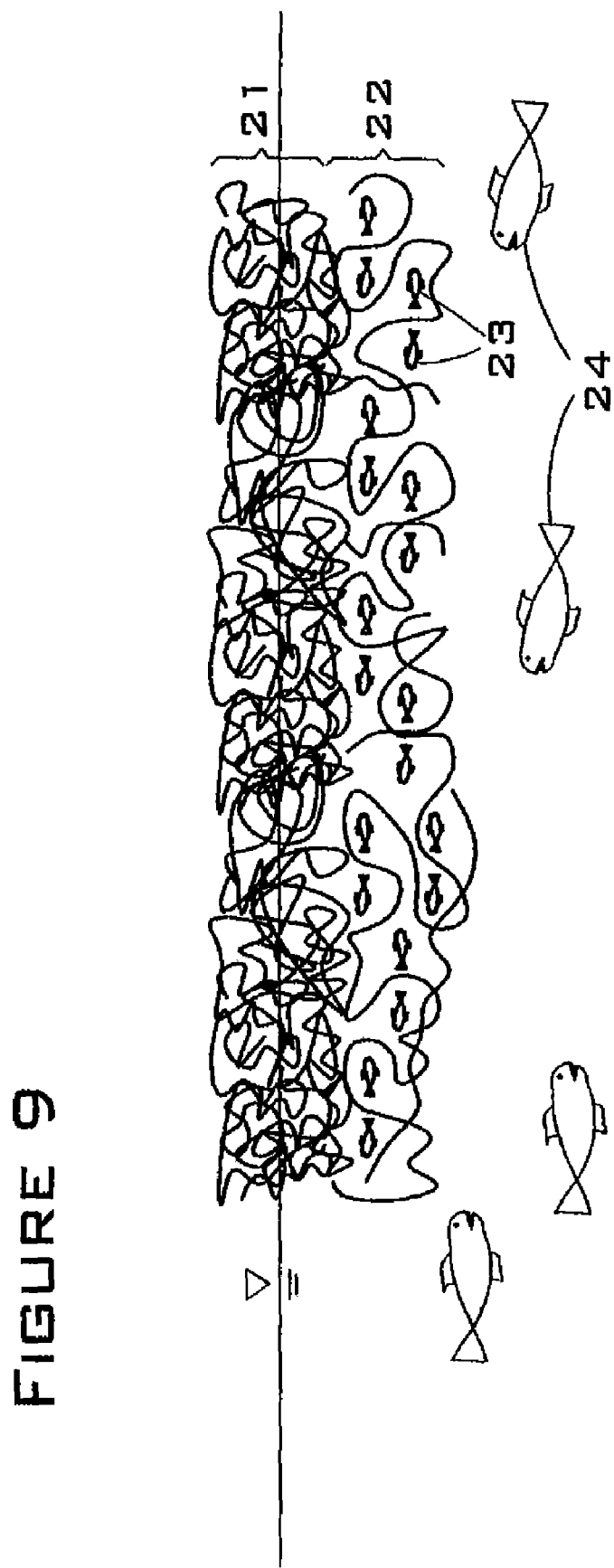
FIG. 9 is a side view of a floating island designed to provide security and feeding habitat for small fish.

FIG. 9 shows a floating island comprised of an upper section of relatively tightly packed nonwoven mesh 21 and a lower section of relatively loosely packed nonwoven mesh 22. The packing densities of meshes 21 and 22 are established during the manufacturing process of these materials. The packing density of the upper mesh 21 is selected so as to optimize it for plant root growth and durability. The packing density of the lower mesh 22 is selected so as to provide openings between the mesh fibers that offer security and feeding habitat for small baitfish 23, while excluding larger predator fish 24. One example of small baitfish 23 is fathead minnows. Examples of predator fish 24 include bass and trout. Examples of foods that are consumed by baitfish within the lower mesh layer 22 include plant roots, phytoplankton and other algae. The habitat provided by the lower mesh layer 22 results in a larger population of baitfish than would otherwise exist in the pond. This larger population of baitfish promotes water clarity by adding complexity to the food chain and utilizing nutrients for fish growth that would otherwise be used by algae.

FIG. 9 illustrates one way in which the floating island of the present invention can be configured to provide food and shelter for fish. Even the embodiments that do not include the looser mesh shown in FIG. 9 have proven beneficial to fish populations. Specifically, it has been observed that fish living in ponds that contain the floating islands of the present invention actually grow bigger than fish that do not live in such ponds. The reason for this phenomenon is that the floating islands of the present invention provide food in the form of plant roots for fish to eat.

Figure 10:
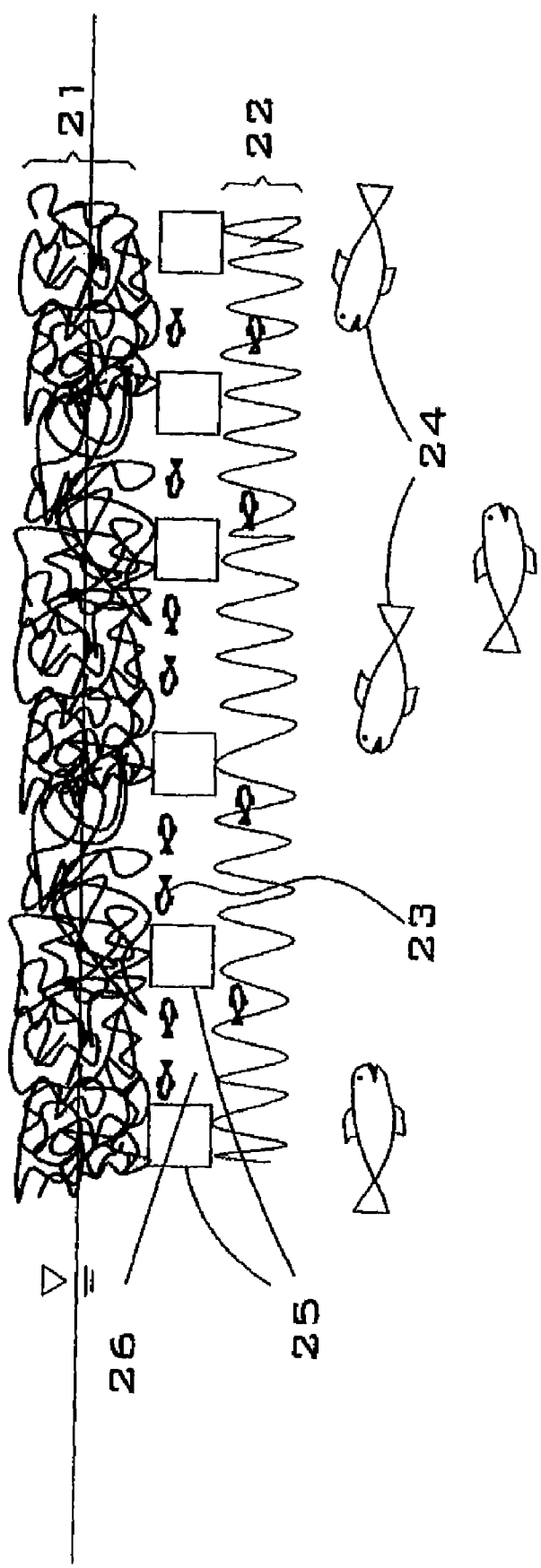
FIG. 10 is a side view of an alternative embodiment of a floating island that uses nonwoven mesh as a protective barrier for small fish.

FIG. 10 is a schematic illustration of an alternative embodiment of a floating island that uses nonwoven mesh as a protective barrier for small fish. The island shown in FIG. 10 is comprised of a relatively tightly packed nonwoven mesh top layer 21, a relatively thin, loosely packed nonwoven mesh bottom layer 22, and buoyant spacers 25 to separate layers 21 and 22. The packing density of the mesh in the lower layer 22 is selected so as to allow small fish 23 to swim through layer 22 and into water pockets 26 that are located between layers 21 and 22. The water pockets 26 provide safe resting and feeding habitats for the small fish 23. With this embodiment, the thickness of the lower layer 22 can be minimized because layer 22 is acting as a barrier to large predatory fish rather than a habitat for small fish.

Figure 11:
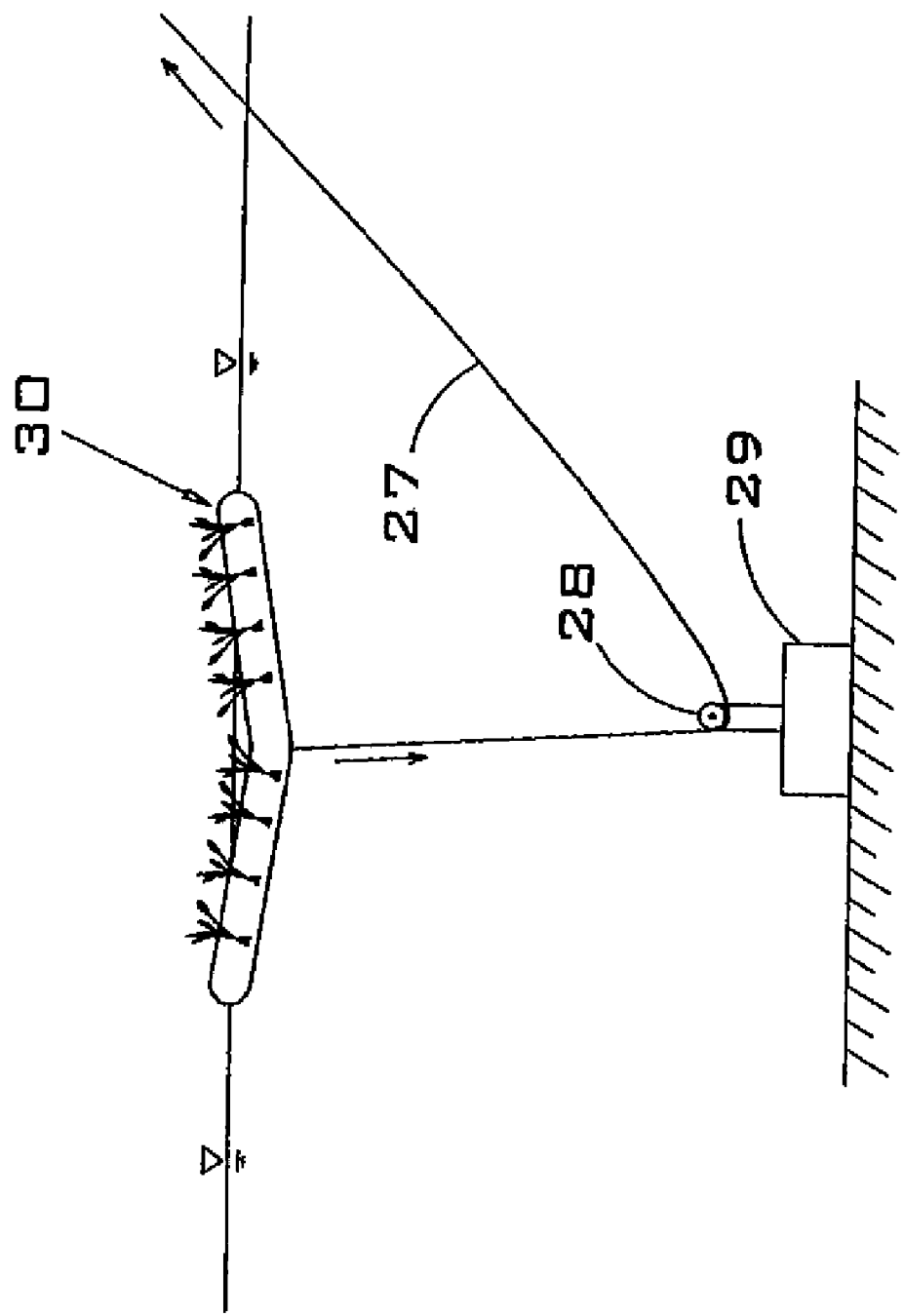
FIG. 11 is a section view of the island illustrating an optional dunking feature.

FIG. 11 illustrates an optional dunking feature that can be used in connection with the nonwoven mesh embodiments of the floating island discussed above. FIG. 11 is a section view of the island shown in a partially submerged or "dunked" position. The dunking feature is comprised of a flexible line 27, a pulley 28, and an anchor block 29. The purpose of this feature is to provide water to the roots of the island plants when these roots do not extend to the pond waterline (for example, when the plants are immature). This feature allows a person to wet the roots from shore without having to use a sprinkler. To wet the roots, the person on shore pulls on the flexible line 27, drawing it through the pulley 28 in the direction shown by the arrows, and causing the island 30 to partially submerge. This action allows the water to enter the porous mesh of the island body. When the flexible line 27 is released, the buoyancy of the island causes it to return to its normal floating position.

FIG. 12 is a section view of the island with optional "capillary action" features to provide water to plants that are growing above the natural waterline within the island. The capillary-action watering feature is comprised of capillary tubes 31 and an absorbent top cover 32. Pond water is drawn up through each capillary tube 31 (as shown by the directional arrows) and released to the absorbent top cover 32, where it is distributed to plants 33 growing above the waterline. The maximum vertical rise of water in the tubes is a function of the tube diameter and the physical properties of the water. One equation that can be used to determine the required tube diameter for a given rise in water height is provided in *Fluid Mechanics* (see reference list) as Equation 2.12:

$$h = (2\sigma \cos \theta / \gamma r)$$

where
  h=capillary rise (length)
  σ=surface tension (force per unit length)
  θ=wetting angle
  γ=specific weight of water
  r=radius of tube The capillary tubes 31 can be fabricated from any suitable material, for example, flexible PVC tubing, semi-rigid polyethylene tubing, or rigid acrylic tubing.

FIG. 13 is a section view of the island with optional "wicking action" features. This embodiment is similar to the capillary-action watering feature of FIG. 12, except that the capillary tubes 31 are replaced by wicking units 34. The wicking units 34 are comprised of fabric or similar materials that have a significant wicking effect on water. In this embodiment, water is wicked up through the wicking units 34 and released to the absorbent top cover 32, where it is distributed to the plants 33.

The wicking units 34 may be preferable to capillary tubes 31 for certain applications because they may enable a higher maximum water rise and may be less prone to bio-fouling. One equation that can be used to determine the theoretical maximum rise due to fabric wicking is provided in the *AUTEX Research Journal* (see reference list) as follows:

$$H_{max} = \frac{\sigma_{LG} * \cos\theta * 2 * \mu - \left[\frac{2/100*}{\sigma_{LG} * (\mu/N)^{1/2}}\right] * (Q * (\cos\theta) + P)}{R_V * (1-\mu) * g * \rho}$$

where
  Hmax=equilibrium suction height
  N=number of fibers in bundle
  $R_v$=radius of fiber
  P=% liquid from surface of bundle
  Q=% non-wetted fibers from surface of bundle
  μ=filling
  ρ=density of liquid
  $\sigma_{LG}$=interfacial tension liquid-air
  θ=contact angle For the embodiments shown in FIGS. 12 and 13, the absorbent top cover 32 may be optionally planted with seeds, or coated with a mixture of seeds, adhesive, and nutrients. In either case, water will be delivered to the seeds via the capillary action shown in FIG. 12 or the wicking action shown in FIG. 13. The mixture may be applied by any suitable means, such as "hydroseeding," wherein a mixture of seeds, paper mulch, and liquid adhesive is sprayed under pressure onto the surface of the island, after which it dries and adheres to the fibers of the island material. In the preferred embodiment, the capillary action of FIG. 12 and the wicking action of FIG. 13 occurs in connection with one of the nonwoven mesh embodiments of the present invention, but these innovations could be used with any floating island embodiment that includes living plants.

Figure 14:
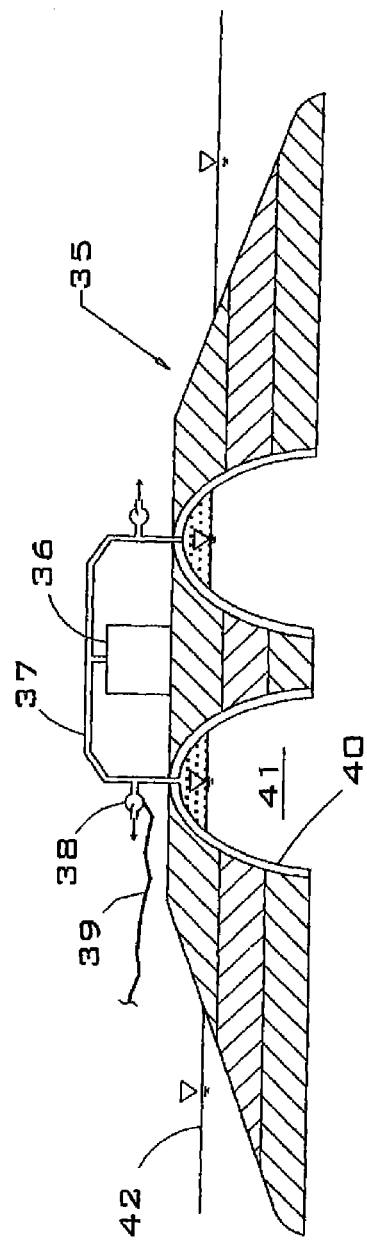
FIG. 14 is a first section view of an embodiment of the present invention with optional flotation "bells."
Figure 15:
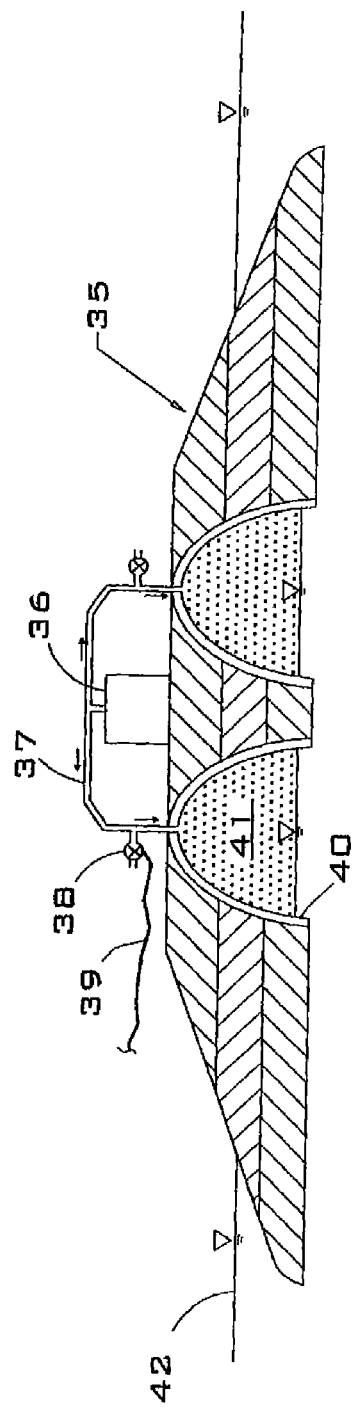
FIG. 15 is a second section view of an embodiment of the present invention with optional flotation "bells" in a high-buoyancy position.

FIGS. 14 and 15 depict another embodiment of the present invention in which the floating island includes bell-shaped flotation units. FIG. 14 is a first section view of the floating island 35 with optional flotation "bells." The bell flotation units are comprised of an air compressor 36, tubing 37, a solenoid valve 38, a control wire 39, one or more bells 40, and one or more internal spaces 41. The pond water level 42 is also shown. In this figure, the bell flotation units are shown in a low-buoyancy position. Although the drawing depicts a system with two bells, any number may be utilized. FIG. 15 is a second section view of the floating island 35 with optional flotation "bells" in a high-buoyancy position.

Referring to FIG. 14, a signal is sent via the control wire 39, which causes the solenoid valve 38 to open, thereby allowing any compressed air within the internal space 41 to vent to the atmosphere. When the air pressure within the internal space 41 equalizes with atmospheric pressure, the water level within the internal space 41 will equilibrate with the pond water level 42. The arrow at the outlet of the solenoid valve 38 represents pressurized air that is escaping from the internal space 41 to the atmosphere. At equilibrium, the flotation bells are providing minimum flotation to the island, and the island sinks to a relatively deep water level.

In order to raise the island to a shallower draft, a signal is sent via the control wire 39, which causes the solenoid valve 38 to shut. Simultaneously, the compressor 36 is turned on, causing air to flow through the tubing 37 into the internal space 41. This air will raise the air pressure in the internal space 41, thereby forcing a portion of water out of the bottom of the bell 40 (in other words, displacing the water that is in the internal space 41). As the water within the internal space 41 is displaced by air, the buoyancy of the bell unit increases, thereby causing a net increase in buoyancy of the floating island, which causes the island 35 to rise partially out of the water. The water level can be set at any desired level between minimum and maximum by shutting off the compressor when the desired air volume in the internal space 41 is achieved.

The bells 40 may be fabricated from any suitable material that is impermeable to air, strong, lightweight and durable. Suitable materials include, but are not limited to, thermoplastics such as polyethylene, foamed thermoplastics such as styrene foam, and closed cell foamed metals such as FOAMINAL, which is produced by Fraunhofer USA. Another material that shows promise for use in this application is foamed amorphous metal, which is currently being tested by LiquidMetal Corporation and other companies.

The internal space 41 may optionally be filled with highly porous material that is permeable to both air and water. This highly porous material may be comprised of any suitable material, including, but not limited to, polyester mesh (such as POLY-FLO from Americo), open-cell foamed metal (such as DUOCEL foamed aluminum from ERG Materials and Aerospace), or open-cell foamed amorphous metal. One advantage of filling the internal space 41 with porous material is that it provides additional surface area for growing beneficial microorganisms. Another advantage is that it provides extra strength and rigidity to the bell unit.

The bell flotation units provide a method for adjusting the overall buoyancy of the floating island, thereby allowing a person to manually adjust the draft of the island. This method can be used with any floating island embodiment. One advantage of this feature is that it provides a periodic water supply to plants and seeds that are located above the normal waterline, by temporarily lowering the island to a near-submerged position and then returning it to a normal position. Another advantage is that it adds buoyancy to the floating island to compensate for the negative buoyancy created by growing plants.

Figure 16:
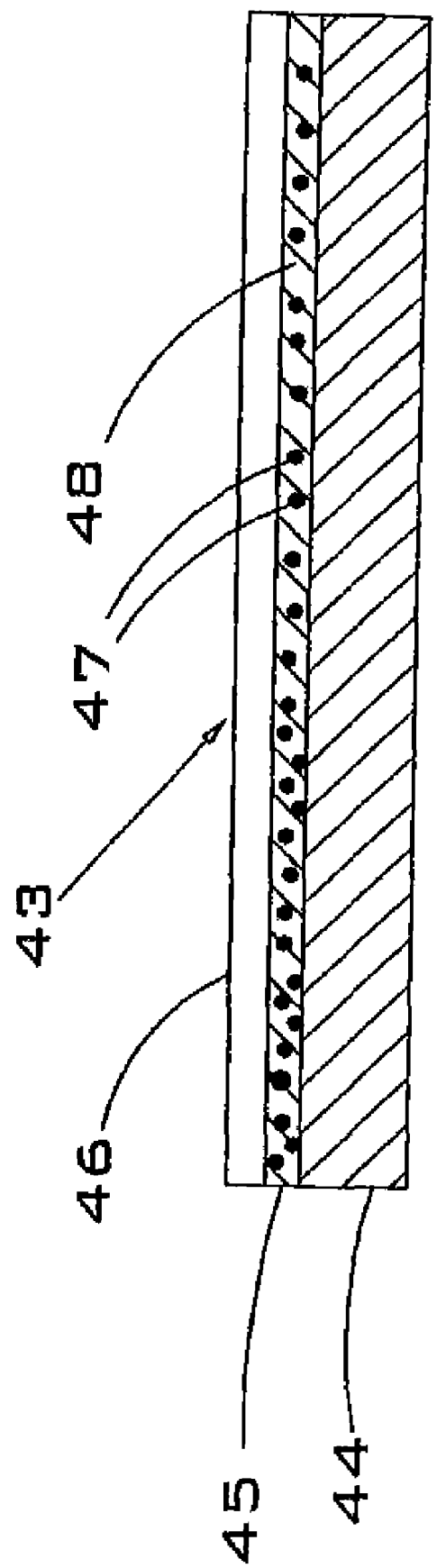
FIG. 16 is a side section view of a prefabricated seed blanket.

FIG. 16 shows a prefabricated seeding product that provides a rapid and easy means of seeding floating islands. The seed blanket 43 is mat-shaped, relatively thin and flexible, and may be rolled for storage and shipment. The seed blanket 43 is deployed by spreading it on top of a floating island and fastening it in place with landscaping pins (not shown) or other suitable fasteners. The seed blanket 43 is comprised of three layers, including a lower seed containment layer 44, a middle composite seed layer 45, and an upper seed containment layer 46. The composite seed layer 45 is comprised of selected aquatic plant seeds 47 and optional binder 48. The binder 48 may include adhesive and/or a moisturizing agent.

The purpose of the lower containment layer 44 is to prevent the seeds from falling through the mesh body of the island. The lower containment layer 44 may be comprised of any suitable material that retains the seeds while allowing plant roots to pass through. Examples of suitable materials for the lower containment layer include fine nonwoven polyester mesh (such as polyester air filter material), coarse woven cloth (such as cheesecloth), and thermoplastic elastomer ("TPE").

The purpose of the upper containment layer 46 is to prevent loss of seeds by air or water currents prior to the time they sprout and take root. The thickness and density of the upper containment layer 46 must not be so great as to prevent the sprouted plants from penetrating the upper containment layer 46 and being exposed to sunlight. Examples of suitable materials for the upper containment layer 46 include fine nonwoven polyester mesh (such as polyester air filter material), coarse woven cloth (such as cheesecloth), and TPE. In some cases, it may be beneficial to use a relatively thin, transparent material for the upper containment layer 46 and a thicker, denser material for the lower containment layer 44. In other cases, it may be preferable for both the upper and lower containment layers 44, 46 to be constructed of the same or similar materials.

In addition to the embodiments described above, the present invention encompasses a larger version of the floating island that is designed to support the weight of one or more persons. An advantage of this design is that plants growing on the floating island can be watered by walking around on the surface of the island, thereby temporarily causing a localized area of the island surface to be depressed to the water level.

FIG. 17 is a section view of a first alternative embodiment of the larger floating island. In this embodiment, the floating island is comprised of nonwoven mesh material 4, buoyant nodules 5, supplemental flotation units 49, and stepping pads 50. The buoyant nodules 5 are designed to support the weight of vegetation and the above-waterline portion of the nonwoven mesh material 4. The supplemental flotation units 49 are each designed to support the weight of one person, and they may be comprised of any material that is suitably buoyant and durable. Examples of suitable materials for the flotation units include polyurethane foam sealant and closed cell polymer foam. The stepping pads 50 provide a non-slippery walking surface and indicate the allowable areas for walking, and they may be comprised of any material that is suitably durable and slip resistant. Examples of suitable materials for the stepping pads include outdoor carpeting and synthetic stones made of molded fiberglass. The buoyant nodules may or may not be necessary depending on the degree of buoyancy provided by the supplemental flotation units.

FIG. 18 is a section view of a second alternative embodiment of the larger floating island. The design of the island shown in FIG. 18 includes the features of the island shown in FIG. 17, plus additional load distribution members 51. When a person steps upon a particular stepping pad 50, the load distribution members 51 distribute the person's weight to several of the supplemental flotation units 49, thereby reducing the distance by which the stepping pad would otherwise move downward. This reduction of downward displacement provides a more stable walking surface than the design shown in FIG. 17. The load distribution members can be made of any suitably durable, lightweight and rigid material. Examples of suitable materials for the load distribution members include PVC pipe and aluminum channels. Two additional materials that may be particularly well suited for this application are metal foam and amorphous metal foam (currently in the development phase). Compared to thermoplastics, these two materials exhibit extremely high strength-to-weight ratios and long-term durability.

In order to provide the required load distribution (and thereby prevent local sagging) of the island surface due to point loads (such as persons) supported by the island, the load distribution members must have sufficient stiffness. The stiffness of a pipe is a function of the pipe diameter, the pipe wall thickness, and the bending modulus of the pipe material. Depending on the size of the island and the design loads, useful pipe diameters may range from about one inch to about 18 inches; useful wall thickness may range from about $\frac{1}{16}$ inch to about one inch; and useful bending modulus may range from about 5,000 pounds per square inch (psi) to 500,000 psi, as measured by ASTM Standard D747-02. These same principles would apply to hose or any other material from which the load distribution members are constructed.

The islands shown in FIGS. 17 and 18 may be assembled on-site near the water edge. When this on-site method of assembly is employed, the islands may be deployed by pushing or pulling the islands into the water with a truck or other mechanized equipment. In order to prevent damage to the structure of the island during installation, the edge of the island coming into contact with the truck or other mechanized equipment may be reinforced with a load-bearing and/or load-distributing protective cover (not shown). This cover may be comprised of semi-rigid thermoplastic, such as polypropylene or PVC sheeting.

Figure 19:
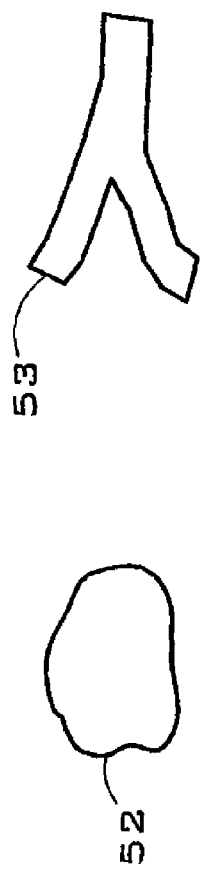
FIG. 19 is a top view of an artificial stepping stone and an artificial tree log.

FIG. 19 shows top views of an artificial stepping stone 52 and artificial tree limb 53. These items may be manufactured form any buoyant, rigid and durable material, such as CAST ALL, which is a two-part expandable polymer foam available from Westco Supply in Ranch Cordova, Calif.

Figure 20:
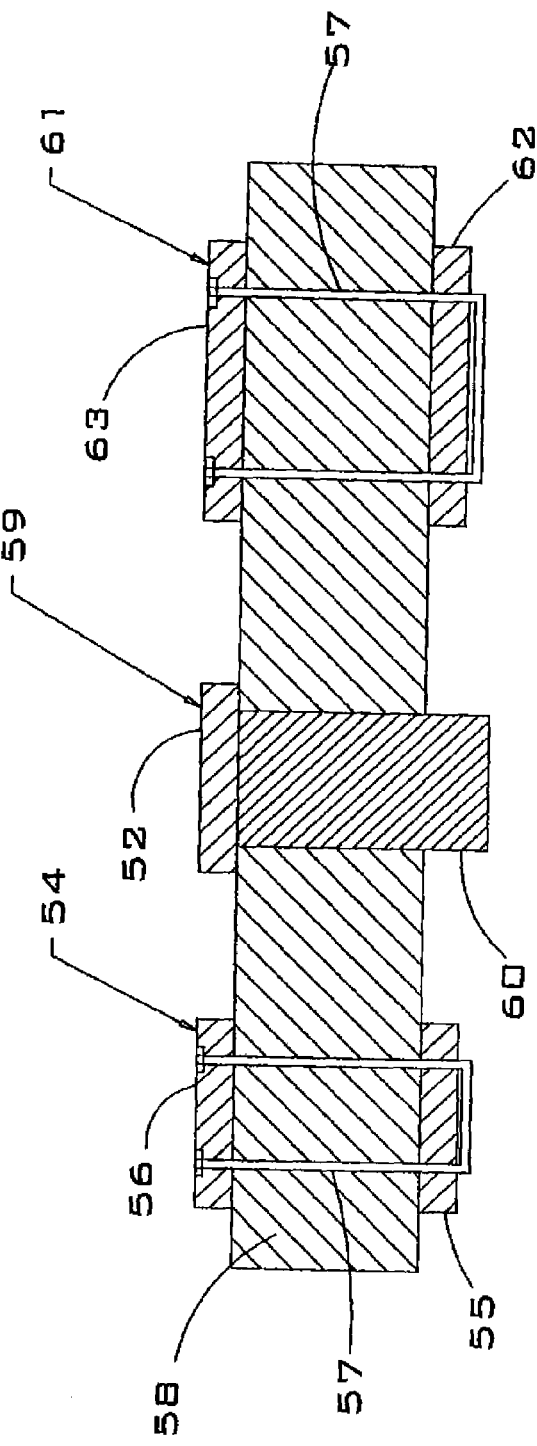
FIG. 20 is a section view of a floating island with stepping stones, artificial logs, and means for providing additional buoyancy.

FIG. 20 shows three alternative methods for using the artificial stepping stone 52 and artificial tree limb 53 that are shown in FIG. 19. In the left example, the stepping stone flotation assembly 54 is comprised of a lower stepping stone 55, an upper stepping stone 56, and a connecting cable unit 57, which firmly attaches the stepping stones 55, 56 to the island body 58. The island body 58 may be comprised of any of the types of islands that have been previously described. The connecting cable unit 57 may be comprised of plastic rope or rustproof metal cable. When the island body 58 is floating normally, the lower stepping stone 55 is submerged and, therefore, provides buoyancy to the island structure. When the island structure is abnormally submerged (e.g., when a person steps upon the island), the upper stepping stone 56 also becomes partially or fully submerged and thus provides additional buoyancy to the structure.

In the middle example, the stepping stone/vertical buoyant member flotation assembly 59 is comprised of an artificial stepping stone 52 and a vertically installed buoyant member 60. The buoyant member 60 may be comprised of air-filled or closed cell foam-filled plastic pipe or other similar material. The buoyant member 60 may be attached to the island body 58 by adhesive (not shown), cable ties (not shown) or other conventional means.

In the right example, the floating tree limb assembly 61 is comprised of a lower artificial tree limb 62, an upper artificial tree limb 63, and a connecting cable assembly 57. The lower tree limb 62 is normally submerged, thus providing buoyancy to the island structure. Additional buoyancy is provided to the structure when the upper tree limb 63 is also partially or fully submerged. It should be noted that the buoyant components (the stepping stones 52, 55, 56 and the tree limb 53, 62, 63) may be replaced with conventional buoyant building materials such as closed cell foam blocks or cylinders (not shown). The natural shapes of the stepping stones 52, 55, 56 and tree limbs 53, 62, 63, however, provide aesthetic appeal to the structure.

Figure 21:
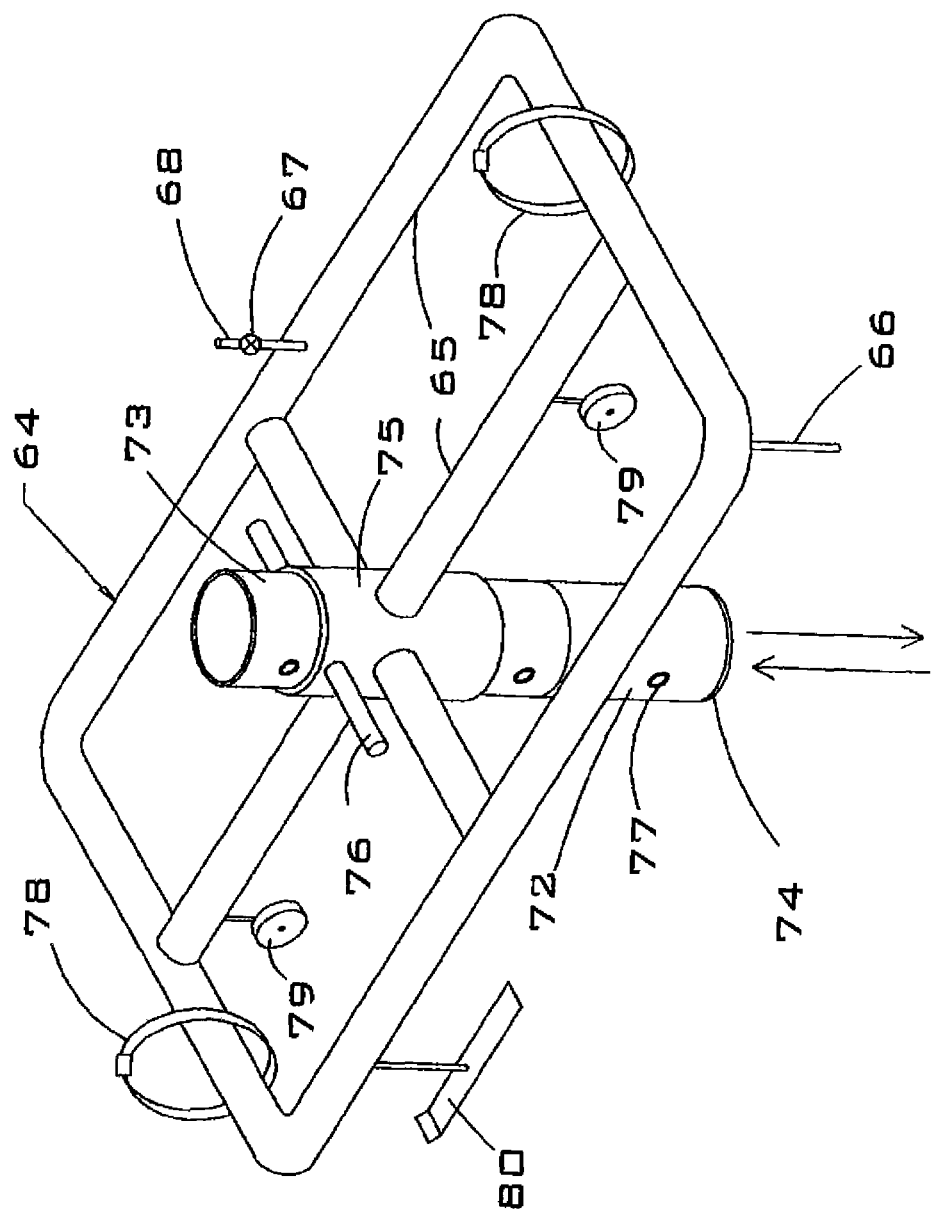
FIG. 21 is a perspective view of the framework for a floating island containing both horizontal and vertical members.

FIG. 21 is a perspective view of a framework that could be used in conjunction with any floating island structure to provide adjustable buoyancy. In the preferred embodiment, it is used in connection with the nonwoven mesh island. FIG. 21 shows the horizontal and vertical components of a variable buoyancy, rigid framework 64. The horizontal members 65 are comprised of hollow plastic pipe or other similar material. These horizontal members 65 may be installed either below or within the mesh matrix body of the island (not shown). The overall buoyancy of the structure is designed so that the horizontal members are set below the waterline. Optionally, the buoyancy of the horizontal members 65 can be adjusted by filling the interior space of the members with water, air, or a combination of both. In one embodiment, water enters the horizontal members 65 via a water tube 66 when the air control valve 67 is open to the atmosphere. Water can be displaced from the horizontal members 65 by blowing compressed air into the air tube 68, thereby forcing water out through the water tube 66. After the water is displaced, the air control valve 67 is closed, which prevents water from reentering the structure. Alternatively, the horizontal members can be filled with foam to increase buoyancy. The buoyancy of the island can also be increased by adding additional horizontal members.

Figure 22:
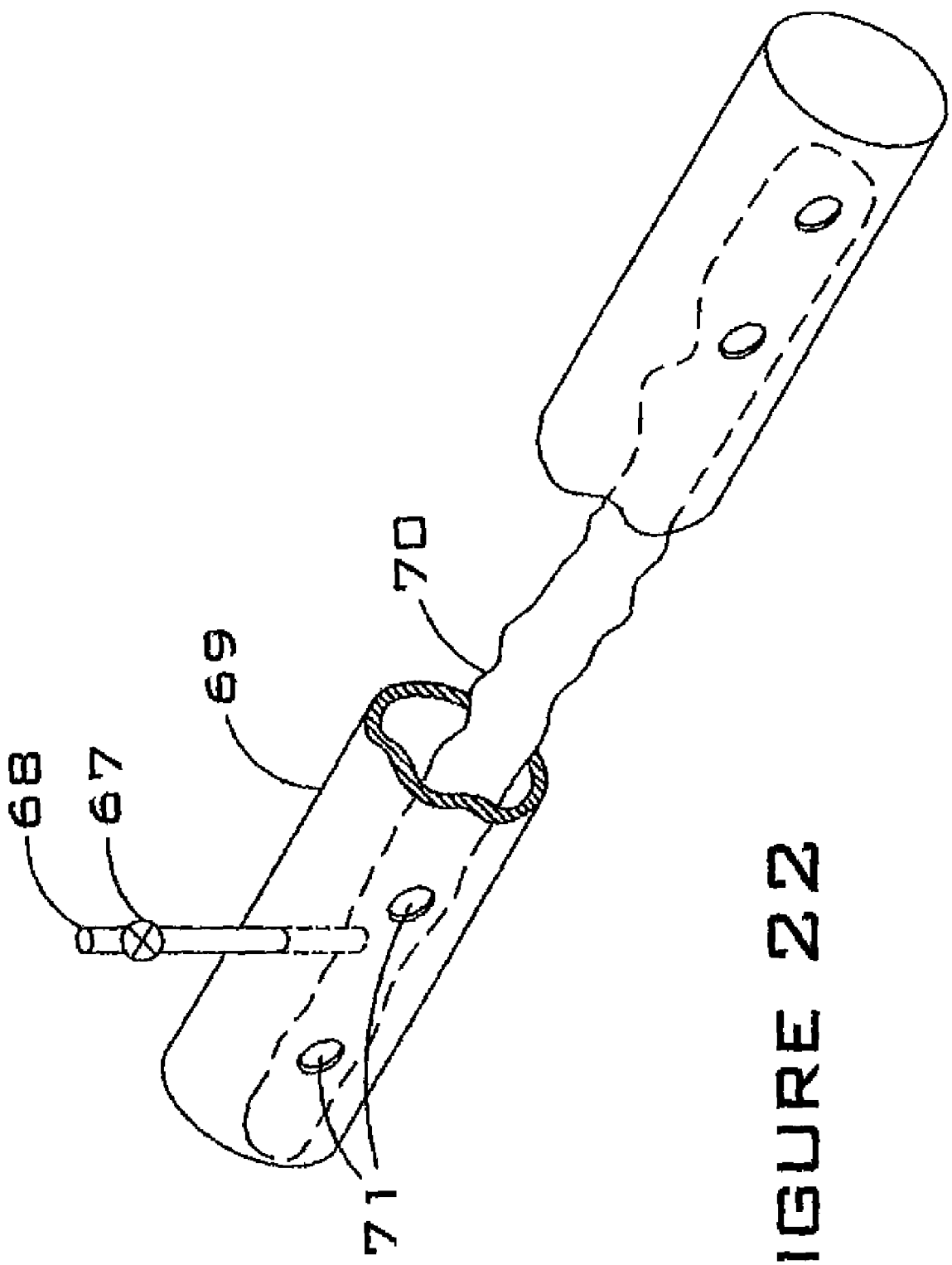
FIG. 22 is a perspective view of an alternative embodiment of the island framework, in which the horizontal members are comprised of a perforated pipe and an inflatable bag.

In an alternative embodiment, shown in FIG. 22, the horizontal members are comprised of a perforated pipe section 69 and an inner, inflatable bag 70. In this figure, the central portion of the pipe section 69 has been removed to show the inflatable bag 70. The inflatable bag 70 is shown in a deflated state, which allows water to enter the perforate pipe through holes 71. When the inflatable bag 70 is deflated, the horizontal members are in a low-buoyancy condition. In order to increase the buoyancy of the horizontal members, an air control valve 67 is opened, and compressed air is forced through an air tube 68 into the inflatable bag 70. As the inflatable bag 70 expands, water is forced out of the pipe through the holes 71, thereby causing an increase in buoyancy. After the inflatable bag 70 is filled with sufficient air to provide the desired degree of buoyancy, the air control valve 67 can be closed. This embodiment may provide a more reliable method of varying the buoyancy of the horizontal members than simply filling the pipes with air because the inflatable bag 70 will maintain buoyancy even if the pipes sustain cracks or leaks over time. The pipes 69 serve as a protective cover for the inflatable bag 70 against puncture and abrasion damage from floating debris and animals.

Referring again to FIG. 21, additional adjustable buoyancy is provided to the rigid framework 64 via the lower vertical member 72 and the upper vertical member 73, which are comprised of hollow plastic pipe or similar material. In a preferred embodiment, the vertical members 72, 73 are joined with threads or another appropriate non-permanent connection. Alternatively, the vertical members can be joined permanently. The interior of the vertical members 72, 73 may be left open or optionally filled with buoyant material such as expandable foam sealant (e.g., Dow Chemical's FROTH-PAC). The lower end of the lower vertical member 72 is sealed with a watertight end cap 74. The buoyancy of the framework 64 is adjusted by sliding the vertical members 72, 73 upward or downward within the collar 75, as shown by the arrows. If a relatively small amount of buoyancy is desired, the lower vertical member can be raised to the maximum height and locked into position with a locking pin 76, which is placed through the locking pin holes 77. If desired, the upper vertical member 73 may be detached from the lower vertical member 72.

To increase the buoyancy of the structure, the locking pin 76 is removed and the vertical members 72, 73 are pushed downward, deeper into the water. The vertical members are then locked into the new position via the locking pin 76. If required, an additional vertical member (not shown) may be connected to the top of the upper vertical member 73, and the vertical members may be positioned even deeper into the water. Locking straps 78 are used to keep the framework 64 attached to the mesh matrix body of the island (not shown).

In addition to providing buoyancy to the floating island, the framework 64 provides a rigid, load-distributing understructure, which can help to support the weight of persons walking on the island. The design of the framework 64 allows the buoyancy to be evenly distributed across the surface of the island, thereby eliminating "high spots" and "low spots" that would otherwise be produced by unconnected buoyant nodules located within the island body. Launching the floating island structure from shore into the water after construction may be facilitated by adding optional wheels 79 and/or skids 80 to the horizontal members 65 of the framework. The wheels and/or skids are preferably buoyant. If the horizontal members are sufficiently rigid, they can serve as skids, thus facilitating the launch of the island into the water without damaging the matrix and eliminating the need to add separate skids.

Figure 23:
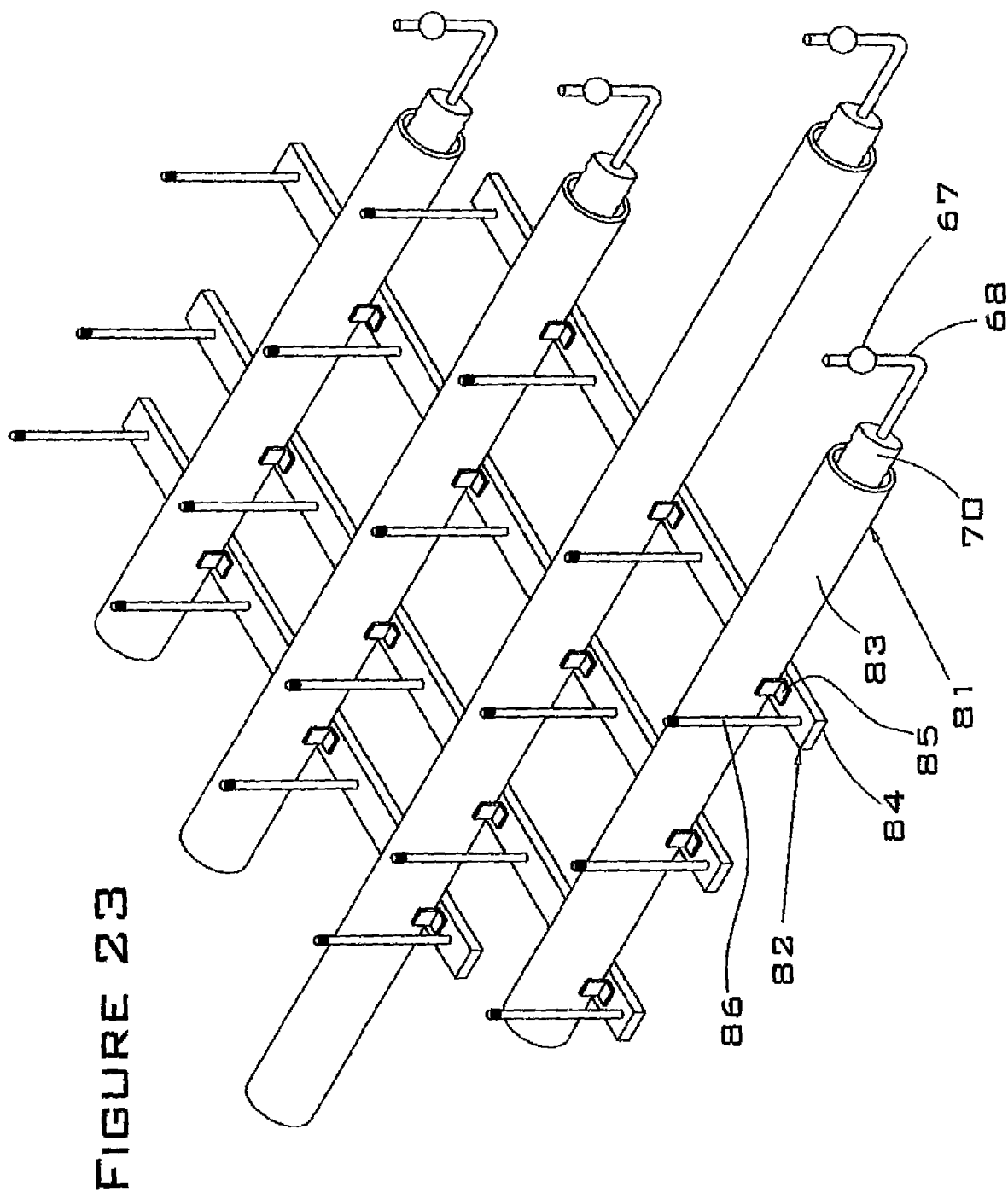
FIG. 23 is a perspective view of an adjustably buoyant flotation framework that is comprised of prefabricated sections.

FIG. 23 shows yet another embodiment of an adjustably buoyant framework for a floating island. In this embodiment, the framework is comprised of prefabricated flotation tubes 81 and prefabricated cross members 82. Each flotation tube 81 is comprised of protective pipe 83, an inflatable tube 70, an air tube 68, and an air control valve 67. Each prefabricated cross member 82 is comprised of a strap 84, a plurality of pipe positioning devices 85, and a plurality of island body attachment posts 86. The purpose of the flotation tubes 81 is to provide buoyancy to the island structure and rigidity to the island surface. The purpose of the cross members 82 is to maintain the flotation tubes at the proper spacing, to provide additional rigidity to the island surface, and to provide a means for attaching the framework to the body of the island. The purpose of the protective pipe 83 is to prevent damage to the inflatable tube 70. The purpose of the inflatable tubes 70, air tube 67, and air control valves 68 is to provide a means for independently varying the buoyancy of each flotation tube 81, thereby providing an adjustable buoyancy across the surface of the island that can be used to compensate for varying and non-uniform loads that are placed (or grow upon) the island. The buoyancy in each flotation tube 81 is increased by increasing the degree of inflation in the inflatable tube 70, which displaces water from the inside of flotation tube 81. The buoyancy is decreased by reducing the degree of inflation in inflatable tube 70, thereby allowing water to enter flotation tube 81.

In a preferred embodiment, the cross members 82 are manufactured in several standard lengths, such as five feet, ten feet and fifteen feet. The straps 84 may be comprised of any relatively stiff and corrosion-resistant material, such as galvanized steel channels, aluminum tubing or rigid plastic tubing. The pipe positioning devices 85 are attached in pairs to the straps 84 by conventional means, with a positioning device 85 on each side of a pipe 83. The island body attachment posts protrude through holes cut into the island body (not shown). Nuts and washers (not shown) are used to secure the island body to the attachment posts 86. The flotation tubes 81 can be manufactured in several standard lengths, such as five feet, ten feet and fifteen feet. They are comprised of materials as previously described in connection with FIG. 22.

The framework depicted in FIG. 23 can be quickly assembled to fit any freeform island shape by using an appropriate assortment of prefabricated flotation tubes 81 and cross members 82. The cross members 82 can alternatively be positioned above the flotation tubes 81. This configuration provides a flat base for the island body. Although the pipe positioning devices 85 are shown in this figure to be comprised of bracket-types fixtures, any conventional positioning fixture could be used. Although the cross members are shown to be rectangular in cross section, other cross section shapes, such as angles, channels or tubing could be used.

Figure 24:
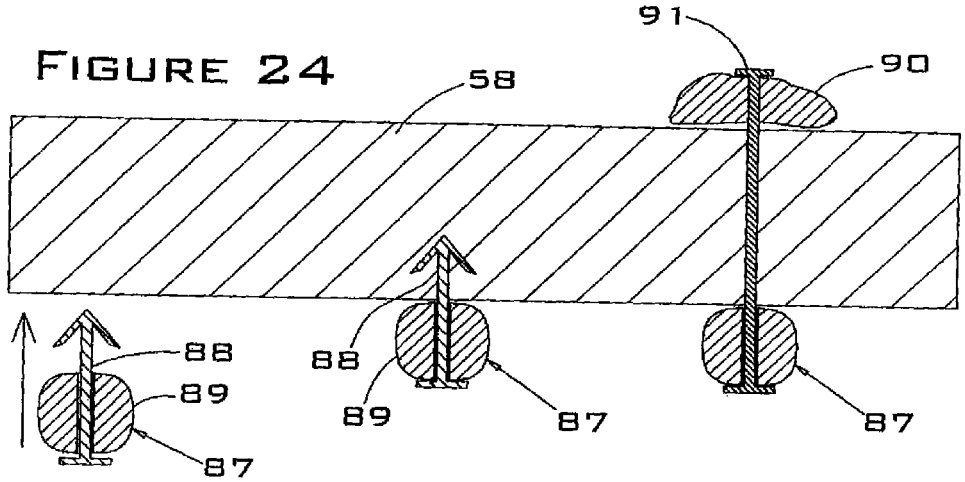
FIG. 24 is a section view of an embodiment of the present invention that includes single attachment point flotation units.
Figure 25:
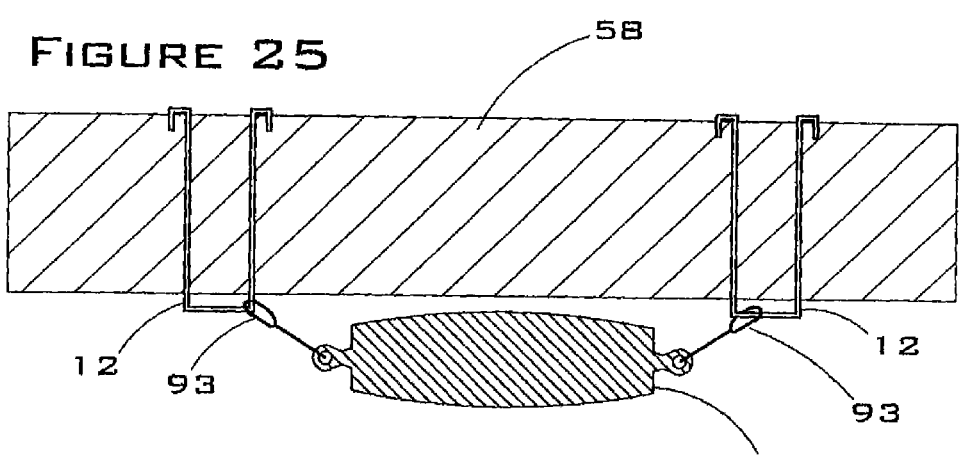
FIG. 25 is a section view of an embodiment of the present invention that includes a dual-ring buoy attached to the island with landscaping pins.

FIGS. 24 and 25 illustrate two different methods for adding buoyancy to an island whose overall buoyancy has decreased over time due to plant growth or other conditions. If desired, these methods may be employed without removing the island from the water.

FIG. 24 shows a section view of an island with single attachment point flotation units 87. The left and center flotation units 87 utilize barbed spikes 88 for attachment. The barbed attachment spikes 88 may be made from corrosion-resistant metal, such as aluminum, or rigid plastic, such as PVC. The floats 89 may be commercially available fish net floats or similar objects made form any suitably buoyant and durable material. The spikes 88 are positioned within a hole inside the floats 89. The left flotation unit 87 in the figure is shown prior to attachment to the island body 58. The arrow shows the direction of movement required to push the flotation unit 87 into the bottom of the island body 58. The barb on the head of the spike 88 allows the flotation unit 87 to be pushed into the mesh material of the island body 58, thereby preventing the flotation unit 87 from slipping out. The center flotation unit 87 is shown in the attached position after the barb has been inserted into the island body 58. The right flotation unit 87 is shown attached to an artificial rock or other buoyant feature 90 by means of a retaining pin 91.

In FIG. 25, a dual-ring buoy 92 is attached to landscaping pins 12 by means of conventional snap-on connectors 93. The landscaping pins 12 may be installed into the island body 58 during original construction, or they may be installed subsequent to construction of the island.

Figure 26:
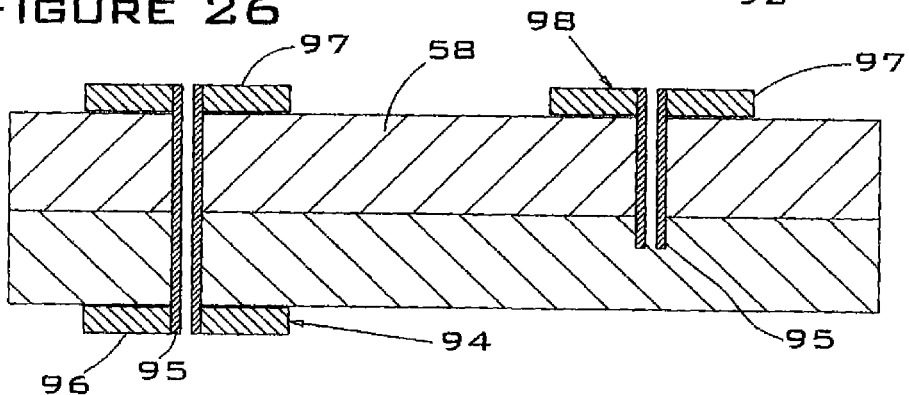
FIG. 26 is a section view of an embodiment of the present invention that includes receiver units.

FIG. 26 illustrates the use of receivers for mounting equipment or accessories on the floating island of the present invention. In FIG. 26, a fully penetrating receiver unit 94 is shown installed into the left portion of an island body 58. The fully penetrating receiver unit 94 is comprised of a length of pipe 95, a lower flange 96, and an upper flange 97. The pipe 95 may be joined to flanges 97, 98 via threaded end connectors or glue joints. The pipe 95 is installed through a hole (not shown) that is cut, drilled or otherwise fabricated in the island body 58. A partially penetrating receiver unit 98 is shown on the right side of the island body 58 and is comprised of an upper flange 97 and a length of pipe 95 that does not penetrate the lower edge of the island body 58. The main purpose of the receiver units 94, 98 is to provide a mounting location for equipment or accessories such as solar panels, wind generators, or decorative items (not shown) that may be desirable for a particular island configuration. A plurality of receiver units 94, 98 may be installed on an island. A secondary purpose of the receiver units 94, 98 is to provide a means for locking together multiple layers of material within the island body.

Figure 27:
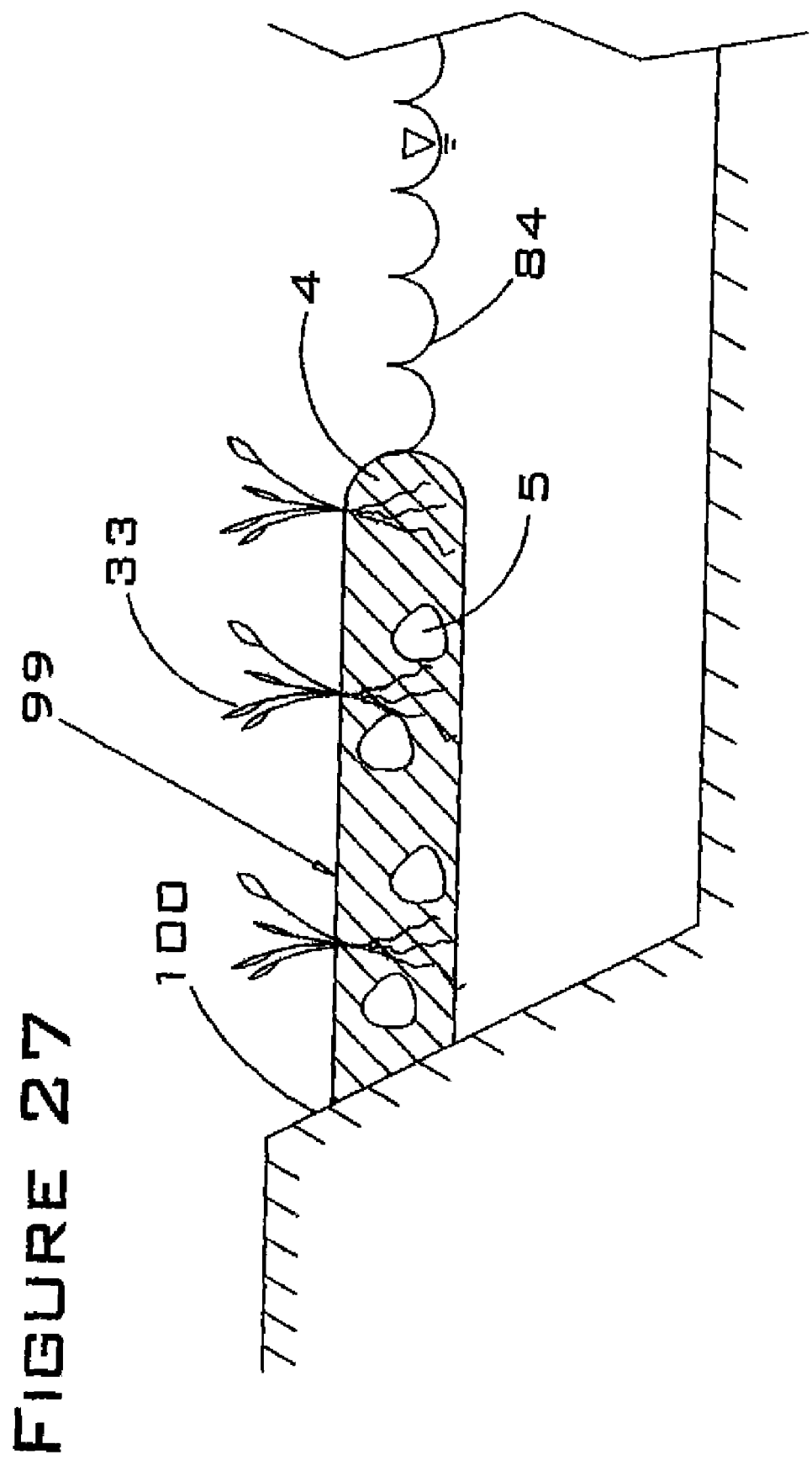
FIG. 27 is a section view of an energy-absorbing and wave-damping floating structure made from nonwoven mesh material.

FIG. 27 illustrates a method of using the floating island of the present invention to bolster a shoreline. In this figure, the protective floating structure 99 is comprised of nonwoven mesh matrix 4, buoyant nodules 5, and optional plants 33. A conventional anchor or tether (not shown) may be used to maintain the position of the structure 99 relative to the shoreline 100. The structure 99 can be used to prevent erosion to the shoreline 100 by serving as an energy-absorbing damper to waves 101. The structure 99 can also serve as a protective barrier to prevent floating objects (such as boats or logs, not shown) from striking the shoreline 100. The depth of the floating island can be adjusted to accommodate whatever level of shore or bank erosion protection is desired.

With respect to any of the above embodiments, additional thin and lightweight island modules may be attached around the perimeter of the main central floating island in order to provide additional shade and plant growth area, thereby increasing the water quality benefits of the island. These additional island modules can be made of a single layer of nonwoven mesh material or similar suitable material, impregnated with buoyant material. While the central floating island could support larger plants, these "satellite" module islands could support short plants such as grasses and sedges. In addition, any of the embodiments of the present invention could be combined with artificial vegetation, if desired, for additional cosmetic effect.

Figure 28:
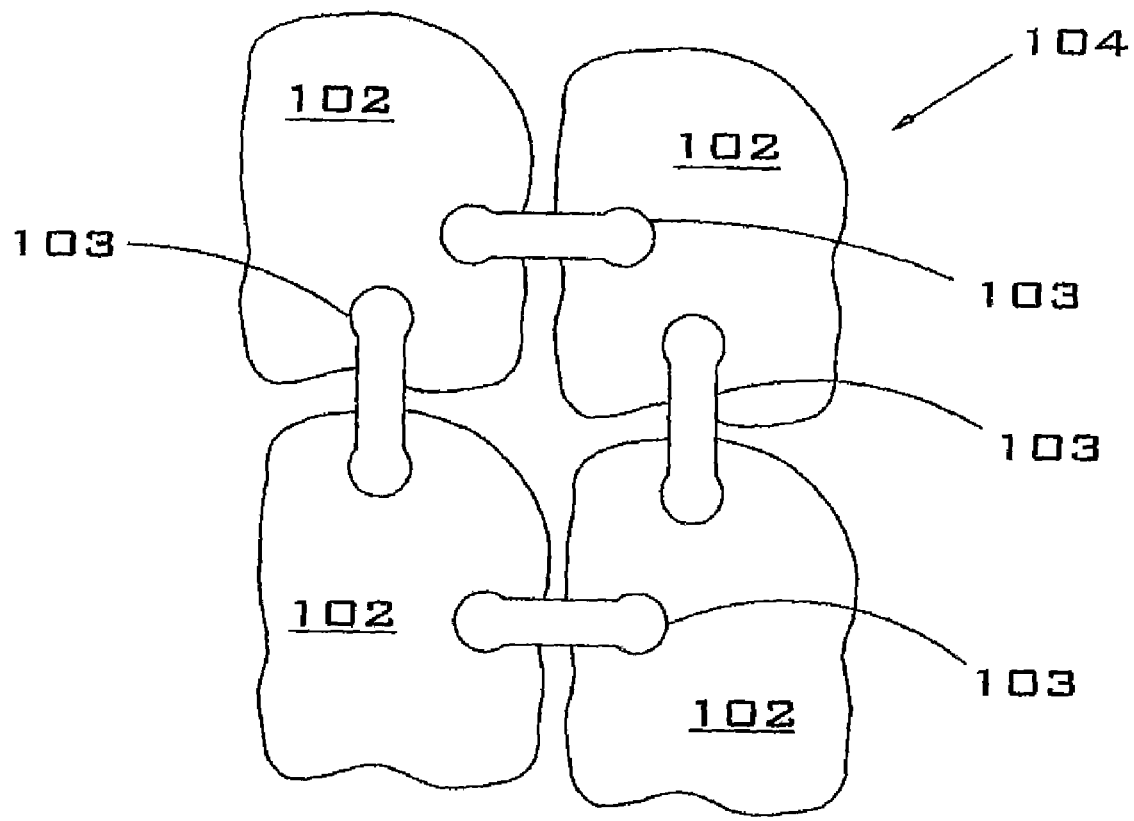
FIG. 28 shows a group of identical, mass-produced floating islands (made of nonwoven mesh material) that are connected to form a single island.

FIG. 28 shows a group of identical, mass-produced floating islands (made of nonwoven mesh material) that are connected to form a single large island. FIG. 28 is a top view of four identical, mass-produced islands 102 that are joined with four connectors 103 to form a modular island structure 104. The connectors 103 are comprised of nonwoven matrix material. The connectors 103 may optionally be treated with bonded growth medium (described below) or other materials to promote plant growth. The plant-sustaining ability of the connectors 103 contributes to the visual appeal and biological diversity of the structure, while the mass-produced islands 102 provide a cost-effective manufacturing technique.

Figure 29:
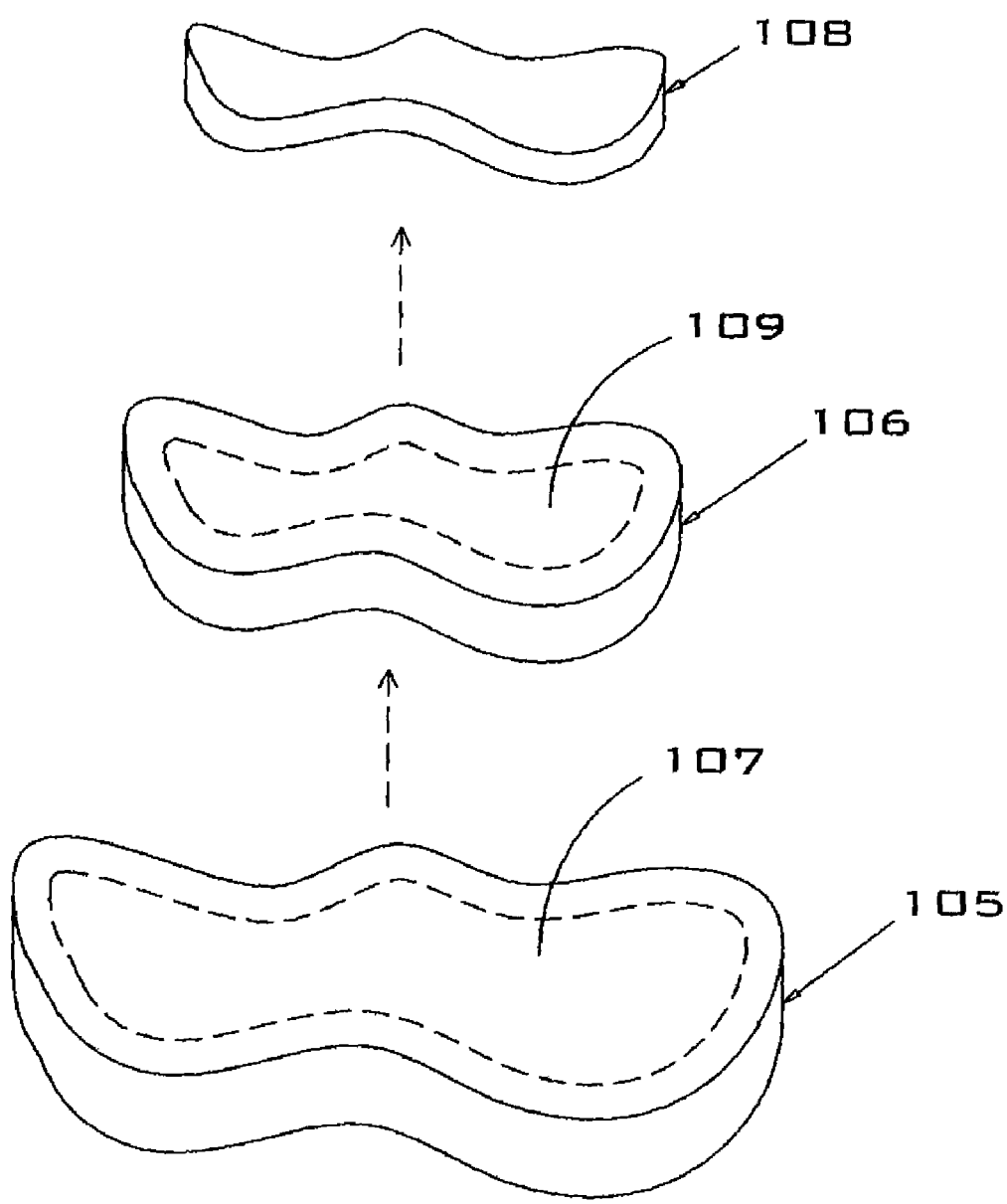
FIG. 29 shows a series of islands produced by the multiple concentric cutout method.

In yet another embodiment of the present invention, concentric multiple cutouts provide numerous islands with reduced constructions costs. FIG. 29 shows a first island 105 from which the central portion has been removed, creating a second island 106 and a central opening 107 within the first island 105. The central portion of the second island 106 has similarly been removed, creating a third island 108 and a central opening 109 within the second island 106.

The multiple concentric cutout design shown in FIG. 29 provides a significant reduction in materials required for construction of islands, thereby providing a significant cost saving for manufacture. Although FIG. 29 shows a total of three islands, this number will vary depending on the size of the first island 105 and the desired size of the last island.

Figure 30:
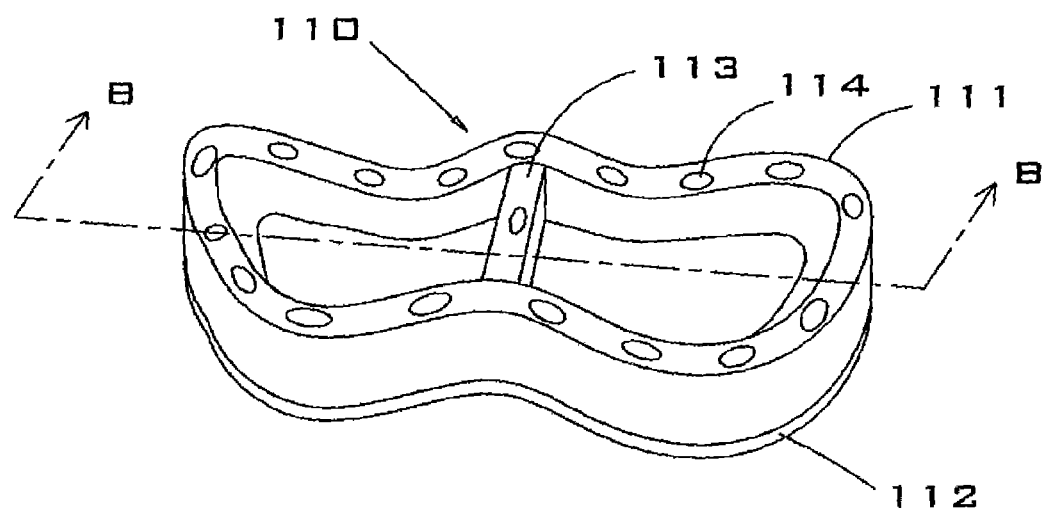
FIG. 30 shows a perspective view of a skeleton frame island created by using the multiple concentric cutout method.

FIG. 30 shows a perspective view of a skeleton frame island 110 created by using the multiple concentric cutout method. The skeleton frame island 110 is comprised of a skeleton frame 111, a floor 112, one or more optional dividers 113, and buoyant intrusions 114. The skeleton frame, floor and dividers are all preferably comprised of nonwoven mesh material.

Figure 31:
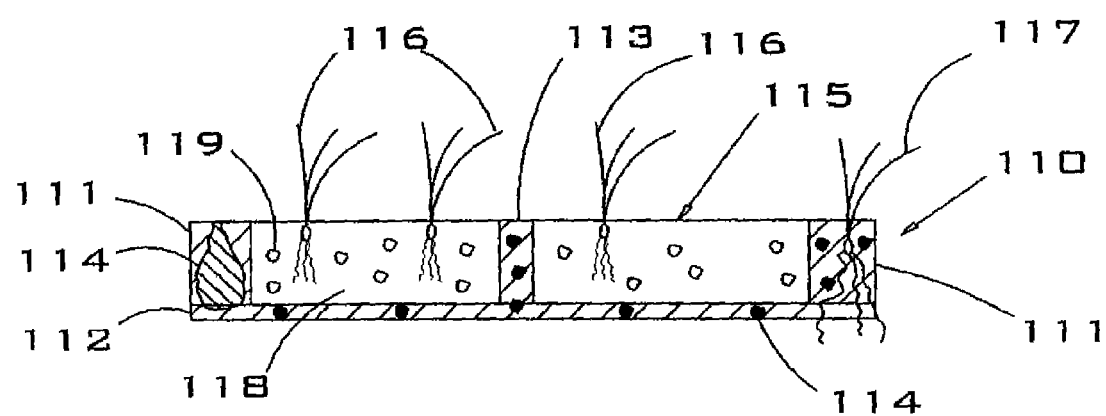
FIG. 31 shows a section view of skeleton frame island taken at line B-B of FIG. 30.

FIG. 31 shows a section view of skeleton frame island 110 taken at line B-B of FIG. 30. As shown in FIG. 31, the skeleton frame island 110 is comprised of skeleton frame 111, floor 112, divider 113, buoyant intrusions 114, soil growth medium 115, soil-based plants 116, and matrix-based plants 117. Matrix-based plants are plants that are grown on portions of the island that are comprised of the nonwoven mesh material. The matrix-based plants may be started from either seeds or rooted plants that are installed into the matrix. Seeds may be sprinkled onto the top of the matrix and may optionally be bonded to the matrix fibers with any suitable adhesive. Rooted plants are installed into precut holes within the matrix.

The soil growth medium 115 is comprised of natural organic material 118, such as peat, and of synthetic organic material 119, such as pieces of nonwoven polyester scrap material. Bonded growth medium (not shown, described more fully below) may be infused into the skeleton frame 111, floor 112, and/or divider 113. The bonded growth medium provides a durable environment for seed germination and plant growth.

The relative growth rates of soil-based plants 116 and matrix-based plants 117 may be controlled by adjusting the nutrient concentrations and interstitial spacings of the soil growth medium 115 and skeleton frame 111. For example, by setting the nutrient level in the soil growth medium 115 higher than the nutrient level in the skeleton frame 111, the roots of the matrix-based plants 117 will grow faster, while the tops of the soil-based plants will grow faster. Similarly, plant growth rates may be manipulated by adjusting the percentage of interstitial space in the soil growth medium 115 and skeleton frame 111. For example, adding more synthetic organic material 119 to the natural organic material 118 will increase the volume of interstitial spaces within soil growth medium 115, thereby increasing the growth rate of microbes and macrophytes within the soil growth medium 115.

With the skeleton-frame embodiment described above, the growth rates of plant roots on different zones of the island can be manipulated to improve the value of the island for fish and wildlife habitat. In a preferred embodiment, the nutrient levels in the perimeter zone (the skeleton frame) are set at a relatively low level by using bonding agents without added nutrients around the perimeter, while the nutrient levels in the center soil growth medium area are set at a relatively high level by placing nutrient additives into the soil growth medium mixture. In this embodiment, the roots of plants in the perimeter zone will grow rapidly through the matrix into the pond water in search of nutrients, thereby forming an underwater perimeter "curtain" of roots. Conversely, the roots of plants in the central nutrient-rich soil growth medium zone will be able to obtain sufficient nutrients from a relatively small root mass; therefore, these roots will be slow to penetrate through the matrix into the water below. By this means, an underwater root zone will be formed under the island that has a relatively long, dense outer ring and a relatively short, slender-root center area. This embodiment will be attractive to small fish that seek refuge and food within the inner area because larger predator fish will be excluded by the outer ring.

The skeleton-frame island embodiment of the present invention is capable of supporting plant growth over its entire surface area, while conventional "floating planters" have a non-permeable flotation ring around their perimeter that is not capable of supporting plant growth. The ability of the skeleton frame island embodiment of the present invention to support plant growth over the entire surface offers significant advantages for water-quality applications, as well as providing a more natural, visually appealing appearance than conventional floating planters.

Nonwoven mesh scrap material from the cutting and shaping of the skeleton frame 111 and floor 112 may provide a low-cost source of synthetic organic material 119. Adding synthetic organic material 119 will also reduce the saturated weight of the soil growth medium 115, thereby reducing the volume of buoyant intrusions 114 required to float the skeleton frame island 110.

Figure 32:
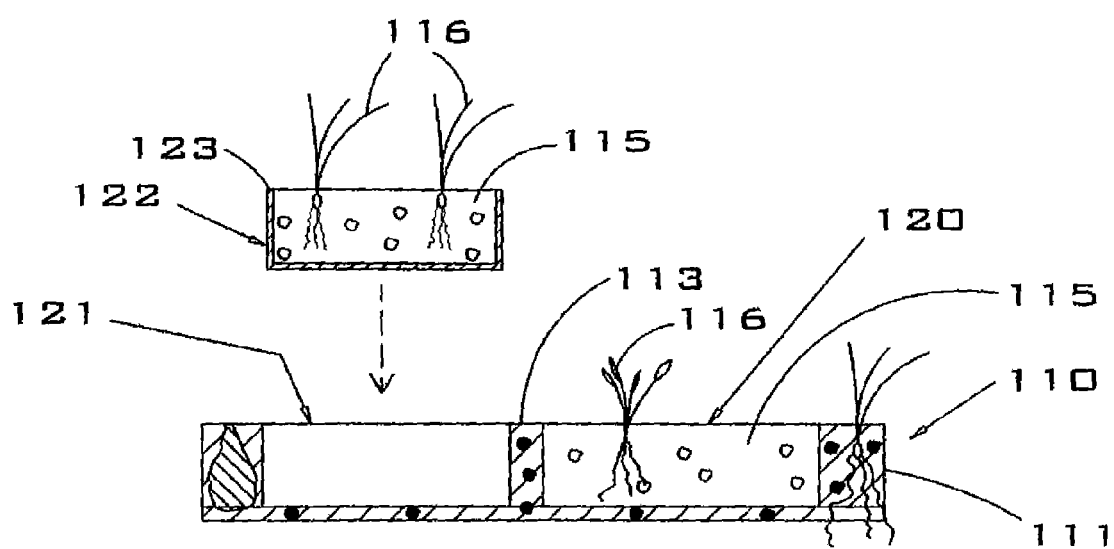
FIG. 32 shows two alternative embodiments for installing plants and soil growth medium into a skeleton frame island.

FIG. 32 shows two alternative embodiments for installing plants and soil growth medium into a skeleton frame island. FIG. 32 is a side section view of a skeleton frame island 110 with two growth compartments 120 and 121 separated by a divider 113, and a prefabricated planter unit 122 shown prior to installation. The first growth compartment 120 is filled by placing soil growth medium 115, plants 116 and seeds (not shown) into the growth compartment 120 by hand. The second growth compartment 121 is filled by placing a prefabricated planter unit 122 into the compartment as shown by the arrow. The prefabricated planter unit 122 may be grown and shipped separately from the skeleton frame island and installed at the deployment site. The prefabricated planter unit 122 may have certain advantages, including the ability to culture plants professionally prior to installation, easy installation and replacement, and cost savings.

The prefabricated planter unit 122 is comprised of a shell 123, soil growth medium 115, optional plants 116 and optional seeds (not shown). The shell 123 is comprised of a material such as coir or nonwoven polyester matrix that is permeable to water and penetrable by plant roots.

The soil growth medium 115 may include pH buffers and modifiers to optimize plant growth for specific conditions. For example, when an island is deployed in acidic pond water with plants that prefer neutral or alkaline pH water, the soil growth medium can comprise calcium carbonate or other similar substance that increases the pH of the water surrounding the plant roots, thereby giving these roots an optimized growth environment during their early growth stage. Similarly, substances that reduce the pH of water can be added to the soil growth medium 115 when an island is deployed in alkaline waters with plants that prefer neutral or acidic pH. Peat is an example of a material that can provide an acidic pH environment.

The present invention also encompasses a bonded growth medium that is optimized for germinating and nurturing plants in an aquatic setting. The bonded growth medium of the present invention is designed specifically to be used as a component of a floating island, although it may be used in other applications as well. As described more fully below, the bonded growth medium encompasses a number of optional features to optimize it for various conditions and for use with a variety of plant species. The bonded growth medium is described below as used with islands comprising a continuous matrix top surface, but can be equally well employed with the skeleton frame island embodiment.

FIG. 33 is a top view of a floating island 124 with bonded growth medium, shown prior to plant growth. FIG. 34 is a section view of the first embodiment of the bonded growth medium taken at section C-C of FIG. 33, in which the bonded growth medium 125 is attached to the outer surface of the floating island 124. The island 124 shown in FIG. 34 is comprised of bonded growth medium 125, porous matrix 126, buoyant inclusions 127, and optional capillary channels 128. Porous matrix 126 may be comprised of any lightweight, porous material penetrable by plant roots. An example of a suitable material is POLY-FLO filter mesh, manufactured by Americo. Buoyant inclusions 127 may be comprised of any nontoxic buoyant material, such as closed cell foam or polyurethane spray foam. Capillary channels 128 are vertical holes cut into the matrix 126 and filled with any suitable wicking material. The purpose of the capillary channels 128 is to transport water through the island matrix 126 and supply it to the bonded growth medium 125 on the top and edges of the island. In a first embodiment, the wicking material in the capillary channels 128 is comprised of peat, polyester felt, or other suitable natural or synthetic material. In a second embodiment, the capillary channels 128 are filled with bonded growth medium.

Figure 35:
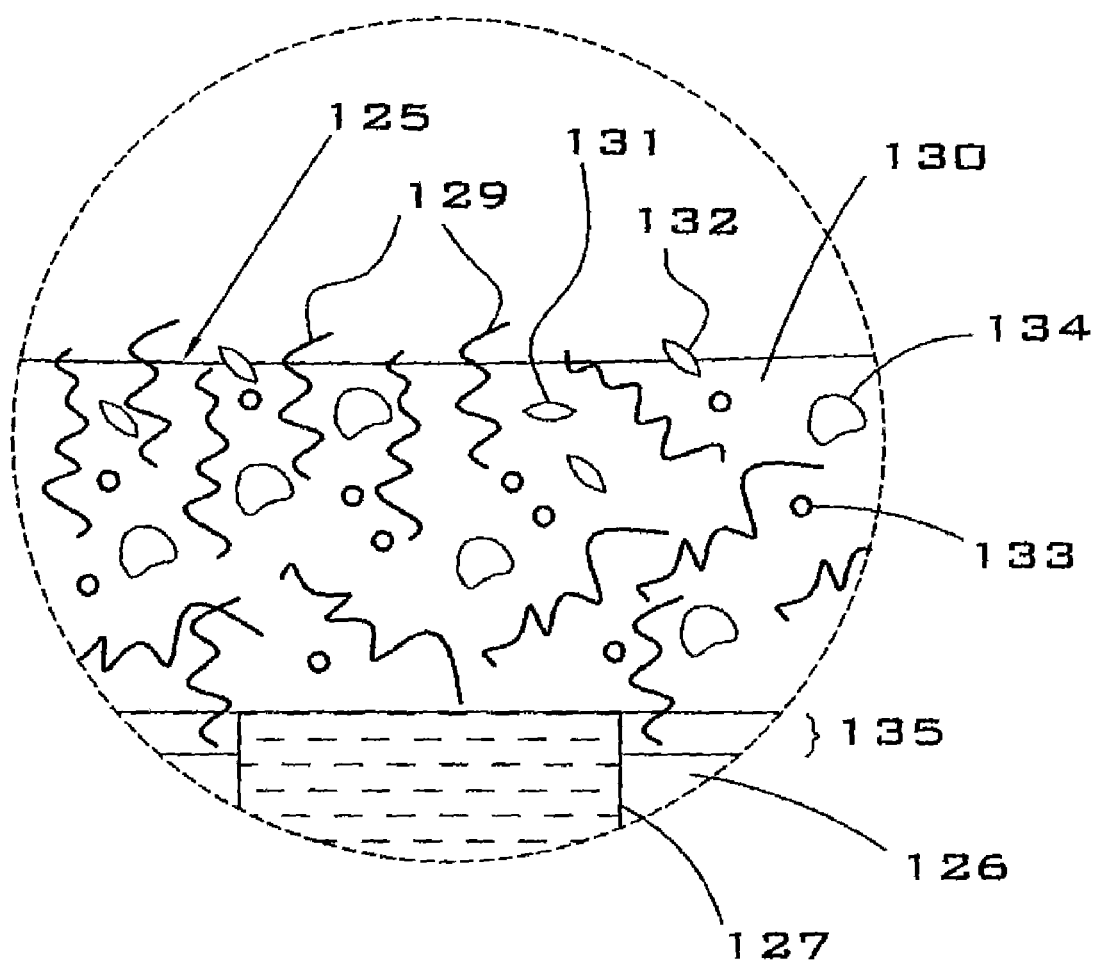
FIG. 35 is a partial magnified view of FIG. 34, showing the various components of the bonded growth medium.

As shown schematically in FIG. 35, the bonded growth medium 125 is comprised of peat fibers (or similar material) 129, binder 130, optional embedded seeds 131, optional topcoat seeds 132, optional nutrient particles 133 and optional buoyant pellets 134. Other optional materials (not shown) include shredded paper, shredded wood, and lightweight synthetic materials. Beneficial microbes (not shown), which include fungi and bacteria, may also be optionally included in the bonded growth medium. By varying the components of the bonded growth medium, the water retention, buoyancy, nutrient level, pH, porosity, interstitial space volume, and other parameters can be modified to optimize for a specific type of plant (e.g., aquatic versus flowering terrestrial), a particular water body (e.g., alkaline or acidic), a particular island shape (e.g., low-floating versus high-floating), or even to create an optimal environment for the growth of beneficial microbes.

The first purpose of the peat fibers 129 is to retain water and absorb radiant sunlight energy, thus providing optimal conditions for plant germination and growth. The second purpose of the peat fibers 129 is to provide a natural, visually appealing surface. A third purpose of the peat fibers is to prevent sunlight from contacting the fibers within the matrix, thereby preventing the growth of algae within the matrix. A fourth purpose of the peat fibers is to reduce the pH of water adjacent to plant roots. The purpose of the binder 130 is to attach the peat fibers 129 and seeds 132, 133 to the matrix 126, and to prevent them from being lost due to wind or wave action. Nutrient particles 133 may be comprised of commercial slow-release plant fertilizer or similar material. Buoyant pellets 134 may be comprised of perlite, polystyrene, or other lightweight closed cell materials. The buoyant pellets provide additional buoyancy to the structure if required for a particular application.

The first purpose of the bonded growth medium 125 is to provide an optimal growth environment for seeds and plants. A second optional purpose of the bonded growth medium 125 is to provide a low-permeability gas barrier around the outer surface of the island, thereby trapping within the body of the island water vapor and gases produced by microbes. The water vapor minimizes "air pruning" of plant roots, and the other gasses provide additional buoyancy to the island structure. The bonded growth medium 125 also serves as a protective agent to prevent deterioration of the matrix 126 and buoyant inclusions 127 by ambient ultraviolet ("UV") sunlight. The UV protection may be provided by the natural light-absorbing qualities of the peat fibers or similar material 129, or the UV protection of the bonded growth medium 125 can be boosted by adding a UV-blocking agent to the uncured bonded growth medium mix prior to application. One example of a suitable common UV-blocking agent is carbon black.

In one embodiment, the binder 130 is comprised of a porous and permeable material, such as open cell polyurethane foam or cellulose (similar to kitchen sponges). In this embodiment, the binder transports water to the seeds 131, 132 and plants (not shown) from the capillary channels 128, or from the water body (not shown) in which the island is floating. In another embodiment, the binder 130 is comprised of nonporous thermoplastic such as TPE or other nonporous, non-permeable binder material. In this embodiment, the ratio of peat fibers 129 and binder 130 is designed so that the proportion of peat fibers 129 is sufficient to serve as the water transport medium through the bonded growth medium 125.

The bonded growth medium 125 is preferably manufactured as a viscous liquid in the uncured state, which changes to a flexible solid after curing. The uncured bonded growth medium 125 is poured or sprayed over the top of the matrix and binds to the matrix 126 during the curing process. An infiltration zone 135 occurs where bonded growth medium 125 infiltrates into the matrix 126 prior to curing. In the case where the temperature of the uncured bonded growth medium 125 is low enough for seeds to survive, the embedded seeds 131 may be added to the mixture during manufacture, and the topcoat seeds 132 may be sprinkled onto the uncured bonded growth medium 125 after it has been applied to the matrix 126. In the case where the temperature of the uncured bonded growth medium 125 is excessive for seed survival, embedded seeds 131 may be installed via holes punched into the partially or fully cured bonded growth medium 125 after it has cooled sufficiently, and topcoat seeds 132 may be attached by a conventional nontoxic adhesive.

FIG. 36 shows an island 124 comprised of individual layers of nonwoven mesh material 4 that have been stacked and bonded together. Also shown are buoyant inclusions 127 and capillary channels 128, which are identical to those items previously described for FIG. 34. In this embodiment, the components of the bonded growth medium are embedded within the matrix layers 4 rather than being applied to the top of the matrix 126, as shown in FIGS. 34 and 35.

FIG. 37 is a magnified view of a portion of FIG. 36, showing the components of the embedded bonded growth medium. Peat fibers (or similar material) 129, binder 130, optional embedded seeds 131, optional nutrient particles 133 and optional buoyant pellets 134 are all similar to the materials described in connection with FIG. 34.

The embedded bonded growth medium shown in FIGS. 36 and 37 can be manufactured in at least three different ways. A first method involves incorporating the components of the bonded growth medium into the matrix layers 4 during the manufacturing process of the matrix. For example, when the matrix layer 4 is comprised of nonwoven polyester mesh (e.g., Americo's POLY-FLO), then the peat fibers 129, nutrient particles 133 and buoyant pellets 134 may be added into the mixing hopper along with the raw polyester fibers. All of the materials are then bonded together when latex binder is added to the matrix.

A second method of manufacturing the embedded bonded growth medium involves injecting the uncured bonded growth medium into each sheet of matrix prior to stacking. This method can be used in connection with nonwoven mesh materials such as Americo's POLY-FLO, which is typically supplied in two-inch thick sheets. Multiple layers of matrix sheets are stacked and bonded to make a floating island, as shown in FIG. 36. The uncured bonded growth medium may be injected into the matrix by pressure spray with optional vacuum assist applied to the back side of the matrix, by point injection via a tube inserted into the matrix, or by gravity infiltration of a low-viscosity blend of uncured bonded growth medium into the matrix.

A third method of manufacturing the embedded bonded growth medium involves stacking the matrix layers prior to injecting the bonded growth medium. Injection is accomplished as described above. In this embodiment, the bonded growth medium may act as an adhesive to bond the layers of matrix.

As alluded to above in connection with the discussion of FIGS. 1-5, a common feature of all of the nonwoven mesh material floating island embodiments of the present invention is that they can serve as a biofilter in at least two respects. First, the island exposes phosphorus and other nutrients found in pond water to the microorganisms (which can be anaerobic or aerobic) present on the island's polymer matrix and/or in the bedding matrix, growth medium, or plant roots. These nutrients help sustain the microorganisms, which contribute to pond and plant health. Second, the island can also act as a means of dispersing certain beneficial microorganisms, including, but not limited to, fungi, throughout a pond or other water body. This dispersal of microorganisms is accomplished as the water that is filtered through the island carries off a fraction of the island's population of microorganisms. These beneficial microorganisms can be naturally occurring, or they can be introduced onto or into the floating island by artificial means.

Further contributing to the filter effect, the plants that are grown on the island can be selected on the basis of their ability to contribute to the removal of phosphorus and other nutrients from the water body. Specifically, the wetland plants that utilize phosphorus in large quantities include: *Scirpus validus* (Bulrush), *Phragmites communis* (common reed), and *Typa latifola* (cattail). Plant uptake of phosphorus during the algae growing season will reduce the amount of phosphorus available for algae production and thereby impact the eutrophication process. It is expected that the types of plants listed above, if grown on the floating island of the present invention, could reduce the overall phosphorus concentration in the water passing through the floating island by 40 to 70%. The amount of nutrients removed by this process will be proportional to the hydraulic loading rate for the island (i.e., the rate at which water passes through the island). Various mechanisms, such as a water pump, could be used to increase the hydraulic loading rate and, therefore, the amount of nutrient removed. In addition, the structure of the island could be adjusted to take maximum advantage of its filtering capacity. For example, the profile of the island above the water surface could be increased to a higher level in order to provide a greater unsaturated volume of media through which water could be filtered.

Figure 38:
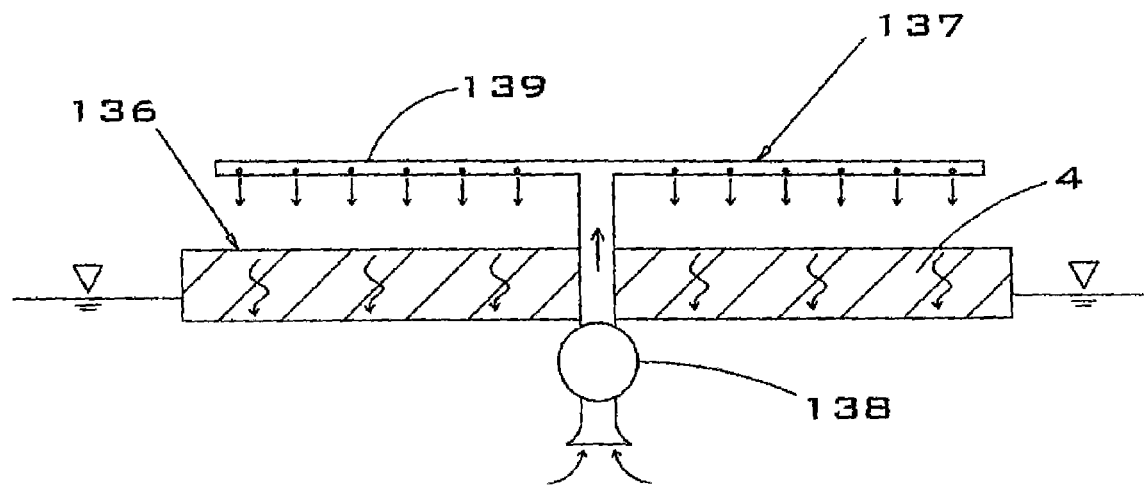
FIG. 38 is a side section view shown in schematic form of a water distribution system mounted on a floating island.
Figure 39:
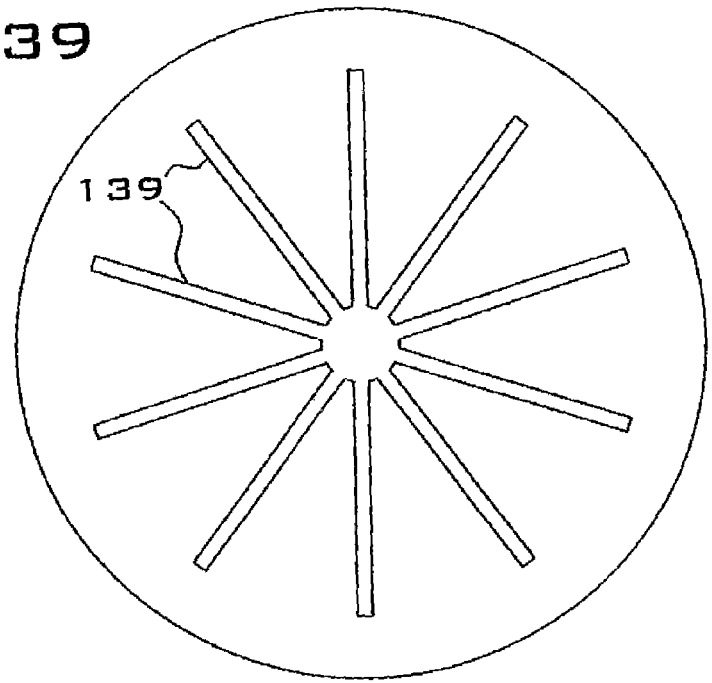
FIG. 39 is a top view of the water distribution system shown in FIG. 38.

To enhance the filter effect of the present invention, a water distribution system may be used to pump water from beneath the island and spread it across the surface of the island, allowing the water to percolate through the fibers of the island matrix (or the nonwoven mesh material) for biological treatment. FIG. 38 is a schematic depiction of a first embodiment of a floating island 136 with a pumped water distribution system 137. The path of water flowing through the system is shown by arrows. The island 136 is comprised of nonwoven mesh 4 plus other materials (not shown). The water distribution system 137 is comprised of a water pump 138 and distribution pipes 139. FIG. 39 is a top view of the water distribution system that shows schematically the distribution pipes 139. This particular water distribution system is designed to distribute water over the surface of the island while not restricting upward plant growth. The purpose of the water distribution system 136 is to pump untreated pond water from beneath the island and spread it across the surface of the island, whereby it can percolate through the fibers of the nonwoven mesh 4 for biological treatment. For maximum treatment efficiency, it is important to distribute the water throughout the entire volume of the nonwoven mesh 4.

Figure 40:
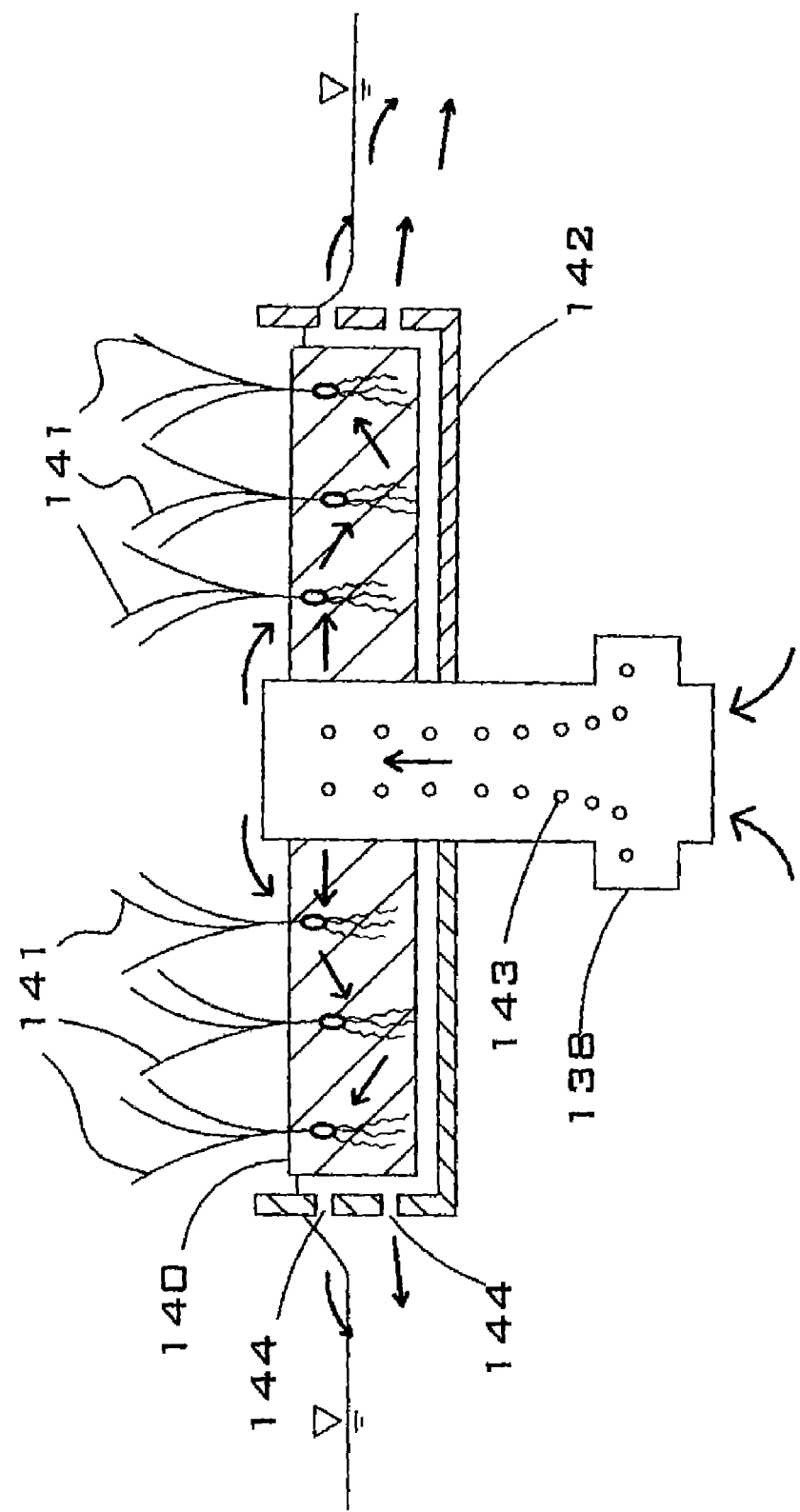
FIG. 40 is a section view of a floating island optimized for use as a biotreatment system.

FIG. 40 is a section view of a second embodiment of a floating island with a pumped water distribution system. The system is comprised of a water pump 138, nonwoven mesh island body 140, nutrient-uptake aquatic plants 141, and water-impermeable enclosure tray 142. For purposes of this description, the term "nutrient-uptake aquatic plants" refers to aquatic plants that absorb and incorporate nutrients found in the water. One example of a highly effective nutrient-uptake aquatic plant is the cattail (genus *Typha*).

The system shown in FIG. 40 works by pumping nutrient-rich pond water from beneath the island and circulating it radially outward through the island body 140. The path of the circulated water is indicated by the arrows in the figure. Optional air bubbles 143 may be provided from an external air source (not shown). In this figure, the water pump 138 is shown as extending vertically through the center of the island, but the water pump 138 could be positioned in any manner that allows it to pump water through the island. In the illustrated example, the water flows through the island body 140 from the center toward the edges and exits the island body 140 through perforations 144 in the perimeter of the tray 142. The purpose of the tray 142 is to ensure that the flowing water does not escape through the bottom of the island, thereby maximizing its exposure time for uptake by the plants 141 and for treatment by microorganisms (not shown) that are attached to the fibers of the island body 140 and the roots of plants 141.

In a preferred embodiment, the tray 142 is constructed of lightweight plastic, such as polyethylene, that is impermeable to both water and plant roots. In an alternative embodiment, the tray 142 is constructed of a material such as TPE that is impermeable to water but that is capable of being penetrated by growing plant roots. The island essentially sits in the tray, and the tray is attached to the floating island by any conventional fastening method.

The purpose of the optional air bubbles 143 is to increase the rate of aerobic conversion of nutrients by microbes. The energy source for the compressed air (not shown) that produces these bubbles may be utility electricity, solar-electric, wind-mechanical, wind-electric, or other suitable means.

In addition to the beneficial effects discussed above, the floating islands of the present invention can also facilitate the process of carbon sequestration, which has become the subject of relatively new international environmental policies that provide financial incentives for growing plants that sequester carbon. Carbon sequestering is accomplished by growing plants that uptake carbon dioxide from the atmosphere and convert it via photosynthesis to organic carbon within the plant. This process reduces the greenhouse effect of atmospheric carbon dioxide by reducing the concentration of carbon dioxide in the atmosphere. In floating islands, carbon dioxide is reduced by direct removal from the atmosphere by the plants, and it is also reduced by microbial processes occurring below the waterline within the root community and matrix of the islands. When dissolved carbon dioxide is removed from water, it causes a corresponding reduction in atmospheric carbon dioxide because carbon dioxide will migrate from the air to the water in order to reestablish equilibrium between atmospheric and dissolved gas phases after the dissolved gas concentration in the water is reduced by the islands. Floating islands offer a novel and unique means for sequestering carbon because they can be installed at locations where typical carbon-sequestering plants (e.g., pine trees) cannot thrive.

The floating islands of the present invention can be positioned over nutrient-rich, oxygen-depleted marine zones, such as the "dead zone" in the Gulf of Mexico. The term "dead zone" generally refers to the situation in which nutrient-rich water flows into an ocean from a river, algae in the ocean water near the surface consume those nutrients and produce oxygen in the process, the algae cells eventually die and sink toward the bottom of the ocean, where the algae cells consume oxygen as they decay. Due to the large number of algae cells falling to the bottom of the ocean, all of the oxygen near the bottom is consumed, and there is no oxygen left in the water for fish, lobsters, or other animals, thus creating a "dead zone" near the ocean bottom. Within the dead zone, the water is nutrient-rich but oxygen-poor. Above the dead zone, near the ocean's surface, the water is both nutrient- and oxygen-rich.

In this situation, water from the dead zone can be pumped over the island (e.g., by windmills on the island), where it will provide nutrients to plants growing on the island. The plants on the island use sunlight energy to combine carbon dioxide from the air with nutrients in the water to make plant mass. This process removes carbon dioxide from the air (reducing the greenhouse effect) and sequesters the carbon in plant biomass. Additionally, when the "dead zone" water is pumped to the surface, new water circulates into the dead zone to replace the water that has been pumped out. This process accomplishes two beneficial effects: reduction of the dead zone and carbon sequestration.

In order to maximize the cost effectiveness of marine-based, carbon-sequestering islands, the islands can be designed so that they are "self-growing" by selecting plants that will provide lateral expansion of the surface of the island during their normal growth and death cycle. Examples of marine plants that could create their own substrate and expand laterally include seaweeds of the genera *Eucheuma* and *Kappaphycus*. Examples of plants that may tolerate a saline environment include Sea Rush (*Juncus maritimus*), Sea Lavender (*Limonium latifolia*) and similar species. By fostering the growth of plants that tolerate saline environments and provide lateral expansion, the originally installed islands act as "island seeds" that grow larger over time.

Another method that could be used to expand the surface area of the floating islands of the present invention involves a biological adhesive and bonding process, such as that described for the marine mussel *Mytilus edulus* in the book *Biomimicry* (Janine Benus, HarperCollins, 1997). The mussel produces cross-linked strands of protein with very high cohesive and adhesive properties, and the mussel-produced adhesive can be applied underwater. This adhesive material would be useful for bonding matrix fibers in the floating islands, for "growing" islands after deployment, and for trapping sediment particles from the water, thereby improving water clarity. "Growing the islands" could be accomplished by periodically dosing the edges of an island with biological adhesive. Because the adhesive remains sticky when wet, it would tend to catch debris such as grass, leaves and twigs floating in the water. This debris would adhere to the edges of the island and provide a substrate for plant growth, thereby causing the island to expand laterally. The adhesive would also trap fine waterborne and windblown sediment particles that contact the island. The biological adhesive could be manufactured by mussels or reproduced synthetically in a laboratory.

Figure 41:
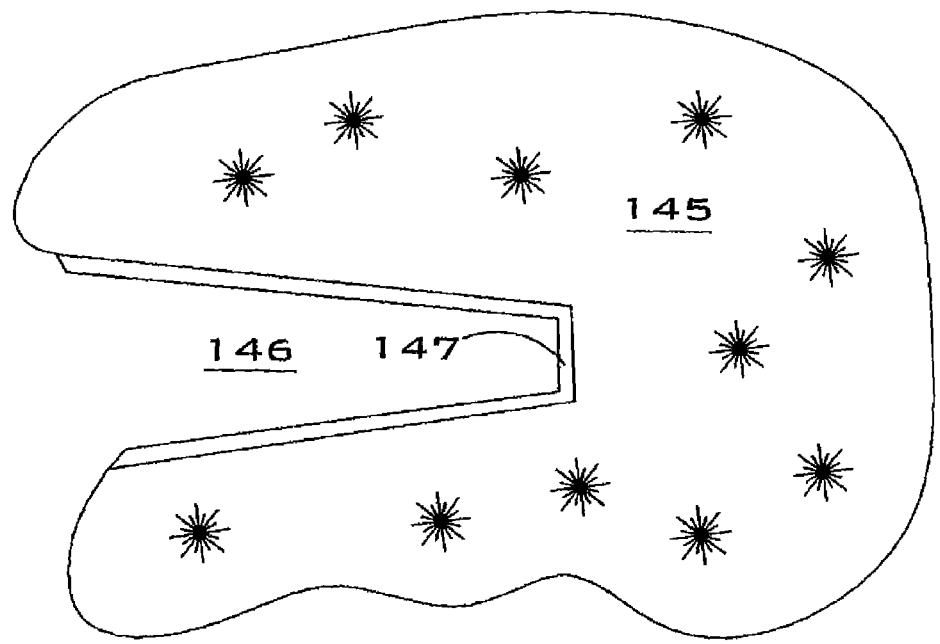
FIG. 41 is a top view of a floating island with an integral boat docking area.

FIG. 41 illustrates a floating island that can also serve as a boat dock. This feature would be useful for docking at the islands for replanting, maintenance, hunting, fishing or photography. FIG. 41 shows a top view of a floating island 145 constructed in a shape that is designed to provide a boat docking location 146. The boat docking location 146 is shaped so that the docked boat is mostly surrounded by island material. Low abrasion padding 147 (such as closed cell polyethylene foam or fine nonwoven polyester mesh) may optionally be placed around the inner perimeter of the docking area to provide extra protection for the boat hull.

The integral boat-docking feature has several useful applications. First, it provides a safe location for storing boats during storms because the flexible nature of the nonwoven mesh island matrix provides an energy-absorbing support for the boat hull during periods of high waves and/or wind. Second, the boat docking area provides an efficient method of supporting the boat during egress and ingress of passengers who may be visiting the island for pleasure or maintenance. Third, the island can be used to provide additional docking facilities where existing docking space is limited or expensive. Fourth, the island can be used as a means for concealing a boat and passengers for hunting or wildlife photography purposes. Although the structure of FIG. 41 is shown surrounded by water, the structure could alternately be attached to shore to act as a boat-docking pier.

Figure 42:
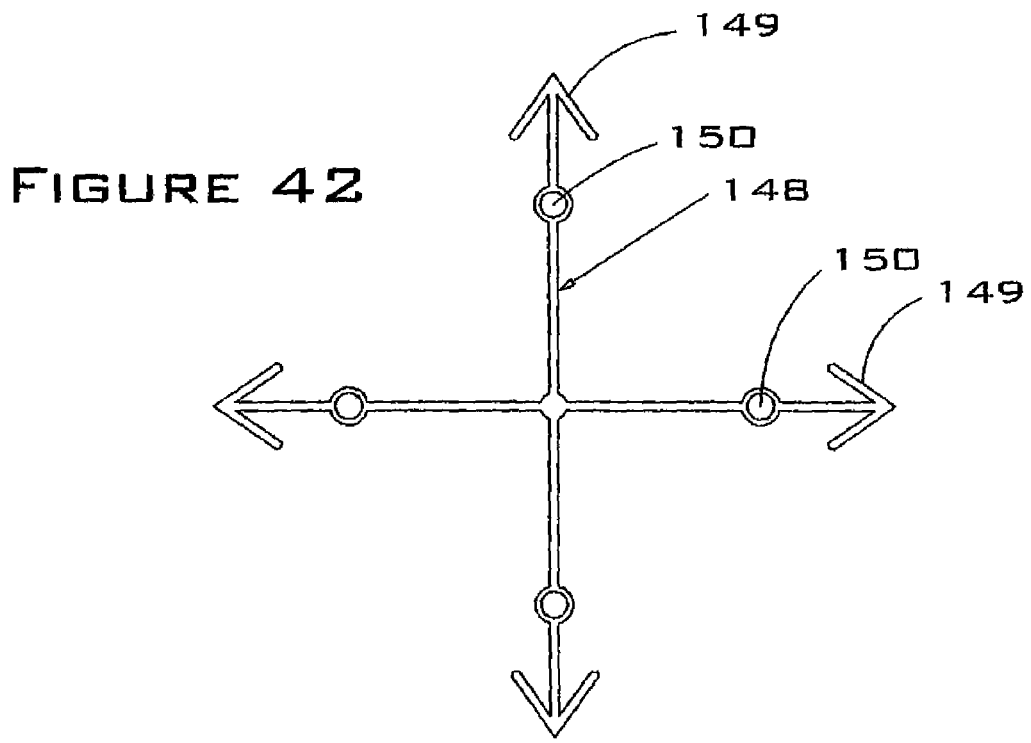
FIG. 42 is a top view of an anchor that is designed to hold a floating island regardless of wind direction.

FIG. 42 illustrates an anchoring device that can be used with the floating island of the present invention. This figure is a top view of an anchor 148 that is designed to hold a floating island regardless of wind direction. The anchor 148 is comprised of four barbs 149 set at 90-degree angles to each other and four ring attachment points 150, as shown. The anchor is designed to be secured to an island with four tether lines (not shown) by attaching one end of each tether line to each ring attachment point 150. The other end of each tether line is secured to an attachment point along the perimeter of an island. Each barb 149 is designed to catch and hold onto the pond bottom when the direction of pull is opposite the direction of the point of the barb. By having a plurality of barbs 149 facing in different directions, at least one barb will be properly positioned for maximum holding ability regardless of the direction pull.

Although numerous embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

REFERENCES

*AUTEX Research Journal*, Vol. 3, No. 2, Association of Universities for Textiles, June 2003, p. 68.
Joseph B. Franzini and E. John Finnemore, *Fluid Mechanics*, 9$^{th}$ ed., a McGraw-Hill Company, 1997.
Robert Kadlee and Robert Knight, "Treatment Wetlands," Lewis Publishers, 1995.

The invention claimed is:

1. A floating island comprising at least one layer of nonwoven mesh material that is water-permeable and penetrable by plants and one or more load distribution members, wherein the load distribution members are internal to the island and positioned beneath one or more non-slip stepping pads located on the surface of the island and in proximity to one or more supplemental flotation units within the interior of the island, wherein the load distribution members are separate from the supplemental flotation units, wherein the load distribution members are comprised of a durable, lightweight and rigid material with a strength-to-weight ratio sufficient to support a person's weight, wherein the load distribution members reduce the distance by which the stepping pad(s) move downward when a person steps on the stepping pad(s), and wherein each stepping pad is a discrete unit surrounded by nonwoven mesh material.

2. The floating island of claim 1, wherein the load distribution members are comprised of pipe.

3. The floating island of claim 1, wherein the load distribution members are comprised of hose.

4. The floating island of claim 1, wherein the load distribution members are comprised of aluminum channels.

5. The floating island of claim 1, wherein the load distribution members are comprised of metal foam.

6. The floating island of claim 1, wherein the load distribution members are comprised of amorphous metal foam.

7. The floating island of claim 1, wherein the diameter of each load distribution member is in the range of about one inch to about 18 inches, wherein the wall thickness of the each load distribution member is in the range of about $\frac{1}{16}$ inch to about one inch, and wherein the useful bending modulus of each load distribution member is in the range of about 5,000 psi to 500,000 psi.

* * * * *